United States Patent
Moon et al.

(10) Patent No.: US 11,153,839 B2
(45) Date of Patent: Oct. 19, 2021

(54) WIRELESS COMMUNICATION NETWORK IN WIRELESS COMMUNICATION SYSTEM

(71) Applicant: Samsung Electronics Co., Ltd., Suwon-si (KR)

(72) Inventors: Sangjun Moon, Suwon-si (KR); Jicheol Lee, Suwon-si (KR); Jungshin Park, Suwon-si (KR); Youngkyo Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 16/539,913

(22) Filed: Aug. 13, 2019

(65) Prior Publication Data

US 2020/0053678 A1    Feb. 13, 2020

(30) Foreign Application Priority Data

Aug. 13, 2018   (KR) .................. 10-2018-0094586
Oct. 5, 2018    (KR) .................. 10-2018-0118976

(51) Int. Cl.
*H04W 56/00*       (2009.01)
*H04W 80/12*       (2009.01)
(Continued)

(52) U.S. Cl.
CPC ....... *H04W 56/005* (2013.01); *H04W 68/005* (2013.01); *H04W 76/22* (2018.02); *H04W 80/12* (2013.01); *H04W 88/023* (2013.01)

(58) Field of Classification Search
CPC . H04W 56/005; H04W 76/22; H04W 68/005; H04W 80/12; H04W 88/023
See application file for complete search history.

(56) References Cited

U.S. PATENT DOCUMENTS 6,751,235 B1 *   6/2004   Susnow ............... H04L 7/10
                                                 370/388
7,657,677 B2     2/2010   Huang et al.
(Continued)

FOREIGN PATENT DOCUMENTS

CN    110784275 A  *  2/2020  ........... H04W 56/00
EP      1041746 B1 *  8/2003  ........... H04B 7/2681
(Continued)

OTHER PUBLICATIONS

Precise Clock Synchronization in High Performance Wireless Communication for Time Sensitive Networking , Deep Shrestha, Zhibo Pang and Dacfey Dzung, IEEE Access (vol. 9), Feb. 12, 2018 (Year: 2018).*

(Continued)

*Primary Examiner* — Deepa Belur

(57) ABSTRACT

The present disclosure relates to a pre-5th-Generation (5G) or 5G communication system to be provided for supporting higher data rates Beyond 4th-Generation (4G) communication system such as long term evolution (LTE). According to various embodiments of the disclosure, a method for operating a base station in a wireless communication system includes receiving, from a terminal, information on a residence time of the terminal and a transmission time of an uplink frame, determining a radio access network residence time based on the transmission time of the uplink frame, and transmitting the radio access network residence time and the residence time of the terminal to a user plane function (UPF).

20 Claims, 17 Drawing Sheets

(51) Int. Cl.
  *H04W 88/02* (2009.01)
  *H04W 76/22* (2018.01)
  *H04W 68/00* (2009.01)

(56) References Cited

U.S. PATENT DOCUMENTS

| | | | |
|---|---|---|---|
| 8,310,395 B2 | 11/2012 | Oehler | |
| 8,576,883 B2* | 11/2013 | Lansdowne | H04J 3/0697 370/503 |
| 8,851,372 B2 | 10/2014 | Zhou et al. | |
| 8,879,552 B2* | 11/2014 | Zheng | H04J 3/0667 370/390 |
| 9,271,216 B2* | 2/2016 | Friman | H04W 40/02 |
| 9,516,512 B2* | 12/2016 | Yi | H04W 16/18 |
| 2004/0008661 A1 | 1/2004 | Myles et al. | |
| 2008/0304521 A1 | 12/2008 | Pavon et al. | |
| 2013/0336307 A1* | 12/2013 | Park | H04W 56/002 370/350 |
| 2015/0110231 A1 | 4/2015 | Ixia | |
| 2018/0270144 A1* | 9/2018 | Jiang | H04L 45/123 |
| 2020/0029291 A1* | 1/2020 | Siomina | H04W 56/0045 |
| 2020/0228220 A1* | 7/2020 | Joseph | H04J 3/0644 |
| 2021/0029658 A1* | 1/2021 | Mahalingam | H04W 56/0005 |
| 2021/0160710 A1* | 5/2021 | Chou | H04W 74/0833 |

FOREIGN PATENT DOCUMENTS

| | | | | |
|---|---|---|---|---|
| WO | 2008/143907 A1 | 11/2008 | | |
| WO | WO-2020081060 A1 * | 4/2020 | | H04J 3/0667 |

OTHER PUBLICATIONS

ETSI TS 129 281 V15.3.0 (Jul. 2018) Universal Mobile Telecommunications System (UMTS); LTE; General Packet Radio System; (GPRS) Tunnelling Protocol User Plane (GTPv1-U) (3GPP TS 29.281 version 15.3.0 Release 15) (Year: 2018).*
3GPP TS 37.324 V2.0.2 (Jun. 2018)—3rd Generation Partnership Project; Technical Specification Group Radio Access Network; E-UTRA and NR; Service Data Adaption Protocol (SDAP) specification (Release 15) (Year: 2018).*
Qualcomm Incorporated, "FS_5GLAN Editorial clean-up", 3GPP TSG-SA WG1 Meeting #81, Feb. 5-9, 2018, S180557, 41 pages.
International Search Report dated Dec. 13, 2019 in connection with International Patent Application No. PCT/KR2019/010257, 3 pages.
Written Opinion of the International Searching Authority dated Dec. 13, 2019 in connection with International Patent Application No. PCT/KR2019/010257, 4 pages.

* cited by examiner

WIRELESS COMMUNICATION NETWORK IN WIRELESS COMMUNICATION SYSTEM

CROSS-REFERENCE TO RELATED APPLICATIONS

This application is based on and claims priority under 35 U.S.C. 119 to Korean Patent Application Nos. 10-2018-0094586 & 10-2018-0118976, filed on Aug. 13, 2018 & Oct. 5, 2018, in the Korean Intellectual Property Office, the disclosure of which are herein incorporated by reference in their entireties.

BACKGROUND

1. Field

The disclosure relates to a wireless communication system, and more particularly, to an apparatus and a method for synchronization using a wireless communication network in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

As a mobile communication technology has developed, there has been a need to provide a clock synchronization technology, which has been provided only in a wired network, in a wireless network. However, due to an asymmetric problem of propagation delay of an uplink (UL) and a downlink (DL) in an air link, it is difficult to introduce the clock synchronization technology in the wireless network. In order to overcome such difficulties, a scheme for providing clock synchronization between terminals in a wireless communication network may be required.

The above information is presented as background information only to assist with an understanding of the disclosure. No determination has been made, and no assertion is made, as to whether any of the above might be applicable as prior art with regard to the disclosure.

SUMMARY

An aspect of the disclosure is to provide an apparatus and method for synchronization using a wireless communication network in a wireless communication system.

Another aspect of the disclosure is to provide an apparatus and method for solving an asymmetric problem of propagation delay of an uplink (UL) and a downlink (DL) in an air link so that a clock synchronization function supported only in a wired network in a wireless communication system can be also supported in a wireless communication network.

In accordance with an aspect of the disclosure, A method for operating a device for a user plane function (UPF) in a wireless communication system, the method comprising: receiving, from a master, a message for synchronization; and transmitting information determined based on an ingress time at which the UPF receives, from a master, the message for synchronization.

In accordance with another aspect of the disclosure, A method for operating a user equipment (UE) in a wireless communication system, the method comprising: receiving information determined based on an ingress time at which an UPF receives, from a master, a message for synchronization; determining a residence time of the message based on the ingress time and an egress time; and transmitting, to slave, information regarding the residence time.

In accordance with another aspect of the disclosure, A user equipment (UE) in a wireless communication system, the UE comprising: a transceiver; and at least one processor configured to: receive information determined based on an ingress time at which an UPF receives, from a master, a message for synchronization; determine a residence time of the message based on the ingress time and an egress time; and transmit, to slave, information regarding the residence time.

As described above, the apparatus and method according to various embodiments of the disclosure may enable synchronization to be performed using a wireless communication network.

In addition, the apparatus and method according to various embodiments of the disclosure may enable a wireless communication network to be utilized in applications requiring clock synchronization between nodes, such as factory automation.

Effects which can be acquired by the disclosure are not limited to the above described effects, and other effects that have not been mentioned may be clearly understood by those skilled in the art from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

The disclosure herein relates to an apparatus and method for synchronization using a wireless communication network in a wireless communication system. Specifically, this disclosure describes a technique for supporting clock synchronization in a wireless communication network by determining the residence time of the wireless communication network based on residence times of respective entities in the wireless communication network in the wireless communication system.

The terms referring to signals used in the following description, terms referring to channels, terms referring to control information, terms referring to network entities, terms referring to components of an apparatus, and the like are illustrated for convenience of description. Accordingly, the disclosure is not limited to the following terms, and other terms having equivalent technical meanings can be used.

In addition, the disclosure describes various embodiments using terms used in some communication standards (e.g., 3rd Generation Partnership Project (3GPP)), but this is merely illustrative. The various embodiments of the disclosure can be easily modified and applied in other communication systems as well.

Figure 1:
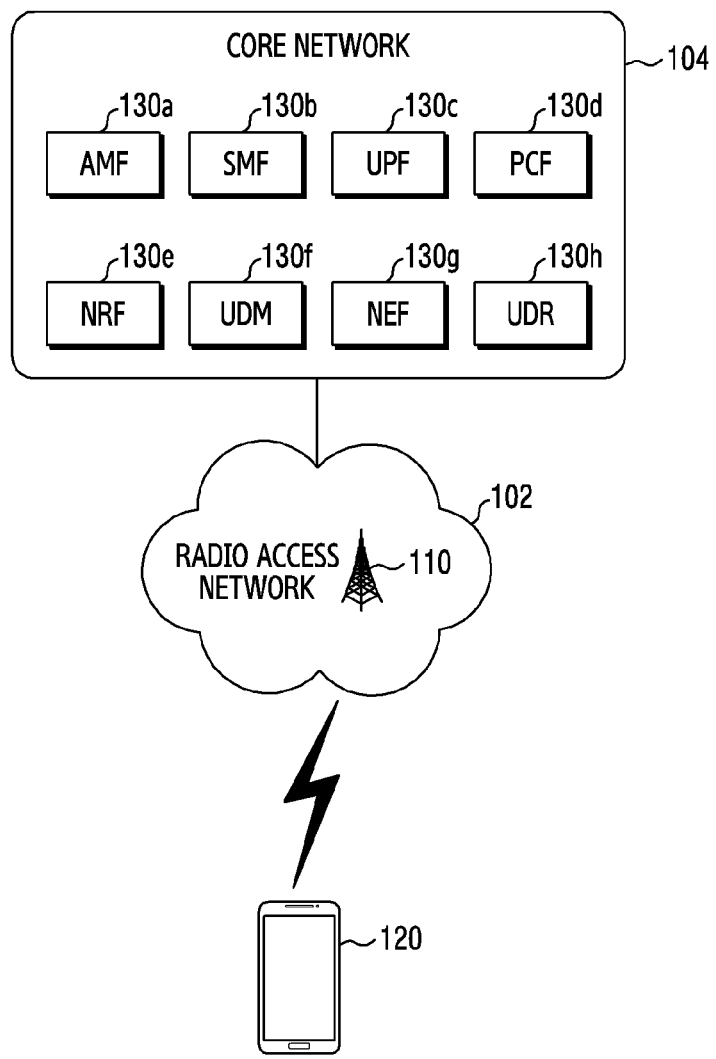
FIG. 1 illustrates a wireless communication system according to various embodiments of the disclosure.

FIG. 1 illustrates a wireless communication system according to various embodiments of the disclosure.

Referring to FIG. 1, a wireless communication system includes a radio access network (RAN) 102 and a core network (CN) 104.

The RAN 102 is a network directly connected to user equipment, for example, a terminal 120, and is an infrastructure that provides a wireless connection to the terminal 120. The RAN 102 includes a set of a plurality of base stations including the base station 110, and the plurality of base stations can perform communication through an interface formed therebetween. At least some of interfaces between the plurality of base stations may be provided in a wired or wireless manner. The base station 110 may have a structure divided into a central unit (CU) and a distributed unit (DU). In this case, one CU can control a plurality of DUs. The base station 110 may be referred to as an "access point (AP)", a "next generation node B (gNB)", a "5th generation node (5G node)", a "wireless point", a "transmission/reception point (TRP)", or other terms having equivalent technical meanings. The terminal 120 may be connected to the RAN 102 and may communicate with the base station 110 through a wireless channel. The terminal 120 may be referred to as "user equipment (UE)", a "mobile station", a "subscriber station", a "remote terminal", a "wireless terminal", a "user device", or other terms having equivalent technical meanings.

The core network 104 is a network that manages the entire system. The core network 104 may control the RAN 102 and may process data and control signals for the terminal 120 transmitted and received through the RAN 102. The core network 104 may perform various functions such as controlling a user plane and a control plane, processing mobility, managing subscriber information, charging, interlocking with other types of systems (e.g., long term evolution (LTE) system), and the like. In order to perform the various functions described above, the core network 104 may include a plurality of functionally separated entities having different network functions (NFs). For example, the core network 104 may include an access and mobility management function (AMF) 130a, a session management function (SMF) 130b, a user plane function (UPF) 130c, a policy and charging function (PCF) 130d, a network repository function (NRF) 130e, a user data management (UDM) 130f, a network exposure function (NEF) 130g, and a unified data repository (UDR)130h.

The terminal 120 is connected to the RAN 102 and is connected to the AMF 130a which performs the mobility management function of the core network 104. The AMF 130a is a function or a device that takes charge of both the connection of the RAN 102 and the mobility management of the terminal 102. The SMF 130b is an NF for managing a session. The AMF 130a is connected to the SMF 130b, and the AMF 130a routes a session-related message for the terminal 120 to the SMF 130b. The SMF 130b allocates a user plane resource to be provided to the terminal 120 in connection with the UPF 130c, and establishes a tunnel for transmitting data between the base station 110 and the UPF 130c. The PCF 130d controls information related to the policy and charging for the session used by the terminal 120. The NRF 130e stores information about NFs installed in a mobile carrier network, and performs a function of informing the stored information. The NRF 130e may be connected to all of the NFs. Each NF is registered in the NRF 130e at the start of driving in the carrier network, and notifies the NRF 130e that the corresponding NF is being driven in the network. The UDM 130f is an NF that plays a role similar to a home subscriber server (HSS) of a 4G network, and stores subscription information of the terminal 120 or a context used by the terminal 120 in the network.

The NEF 130g serves to connect a 3rd party server and the NF in a 5G mobile communication system. The NEF 130g also serves to provide, update, or acquire data to or from the UDR 130h. The UDR 130h performs a function of storing subscription information of the terminal 120, storing policy information, storing externally exposed data, or storing information necessary for a third party application. The UDR 103h also serves to provide stored data to other NFs.

Figure 2:
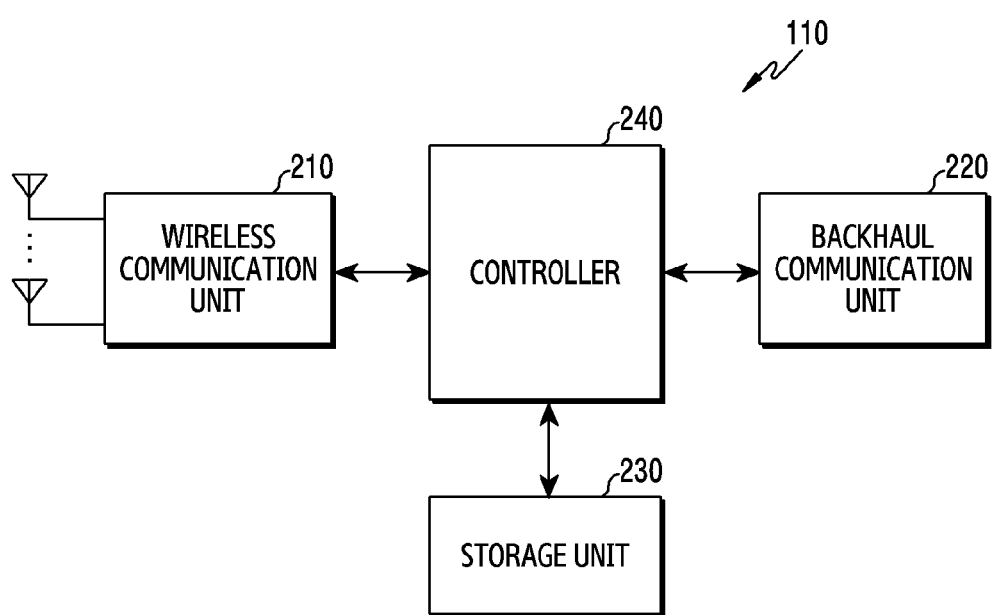
FIG. 2 illustrates a configuration of a base station in a wireless communication system according to various embodiments of the disclosure.

FIG. 2 illustrates a configuration of a base station in a wireless communication system according to various embodiments of the disclosure. The configuration illustrated in FIG. 2 can be understood as a configuration of the base station 110. The terms used herein such as " . . . unit", " . . . -er (-or)", and the like denote a unit for processing at least one function or operation, and may be implemented by hardware, software, or a combination of hardware and software.

Referring to FIG. 2, a base station includes a wireless communication unit 210, a backhaul communication unit 220, a storage unit 230, and a controller 240.

The wireless communication unit 210 performs functions for transmitting and receiving signals through a wireless channel. For example, the wireless communication unit 210 performs conversion between a baseband signal and a bit string according to a physical layer specification of a system. For example, at the time of data transmission, the wireless communication unit 210 generates complex symbols by encoding and modulating a transmission bit string. Also, upon receiving data, the wireless communication unit 210 demodulates and decodes a baseband signal to recover a received bit string.

Also, the wireless communication unit 210 up-converts a baseband signal to a radio frequency (RF) band signal, transmits the RF band signal through an antenna, and down-converts the RF band signal received through the antenna to a baseband signal. To this end, the wireless communication unit 210 may include a transmission filter, a reception filter, an amplifier, a mixer, an oscillator, a digital to analog converter (DAC), and an analog to digital converter (ADC). In addition, the wireless communication unit 210 may include a plurality of transmission/reception paths. Further, the wireless communication unit 210 may include at least one antenna array composed of a plurality of antenna elements.

In terms of hardware, the wireless communication unit 210 may be composed of a digital unit and an analog unit, and the analog unit may include a plurality of subunits according to operating power, an operating frequency, or the like. The digital unit may be implemented with at least one processor (e.g., a digital signal processor (DSP)).

The wireless communication unit 210 transmits and receives signals as described above. Accordingly, all or some of the wireless communication units 210 may be referred to as a "transmitter", a "receiver", or a "transceiver". In the following description, transmission and reception performed through a wireless channel are used to mean that the processing as described above is performed by the wireless communication unit 210.

The backhaul communication unit 220 provides an interface for performing communication with other nodes in a network. That is, the backhaul communication unit 220 converts a bit string transmitted from a base station to another node, for example, another access node, another base station, an upper node, a core network, etc., into a physical signal, and converts the physical signal received from the other node into a bit string.

The storage unit 230 stores data such as a basic program, an application program, and setting information for the operation of the base station. The storage unit 230 may include a volatile memory, a nonvolatile memory, or a combination of a volatile memory and a nonvolatile memory. The storage unit 230 provides stored data according to the request of the controller 240.

The controller 240 controls the overall operations of the base station. For example, the controller 240 transmits and receives signals through the wireless communication unit 210 or the backhaul communication unit 220. In addition, the controller 240 records and reads data in the storage unit 230. The controller 240 may perform functions of a protocol stack required by the communication standard. According to another implementation example, the protocol stack may be included in the wireless communication unit 210. To this end, the controller 240 may include at least one processor. According to various embodiments, the controller 240 may control to perform synchronization using a wireless communication network. For example, the controller 240 may control the base station to perform operations according to various embodiments described below.

Figure 3:
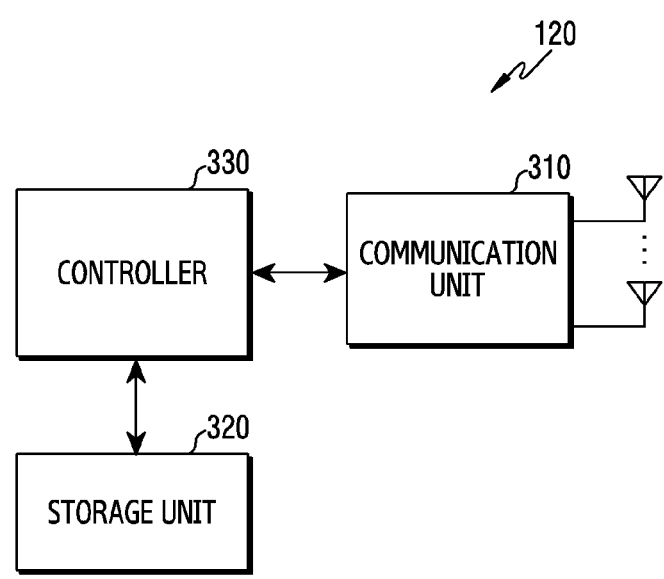
FIG. 3 illustrates a configuration of a terminal in a wireless communication system according to various embodiments of the disclosure.

FIG. 3 illustrates a configuration of a terminal in a wireless communication system according to various embodiments of the disclosure. The configuration illustrated in FIG. 3 can be understood as a configuration of the terminal 120. The terms used herein such as " . . . unit", " . . . -er (-or)", and the like denote a unit for processing at least one function or operation, and may be implemented by hardware, software, or a combination of hardware and software.

Referring to FIG. 3, a terminal includes a communication unit 310, a storage unit 320, and a controller 330.

The communication unit 310 performs functions for transmitting and receiving signals through a wireless channel. For example, the communication unit 310 performs conversion between a baseband signal and a bit string according to a physical layer specification of a system. For example, at the time of data transmission, the communication unit 310 generates complex symbols by encoding and modulating a transmission bit string. Also, at the time of data reception, the communication unit 310 demodulates and decodes a baseband signal to recover a reception bit string. In addition, the communication unit 310 up-converts a baseband signal into an RF band signal, transmits the RF band signal through an antenna, and down-converts the RF band signal received through the antenna to a baseband signal. For example, the communication unit 310 may include a transmission filter, a reception filter, an amplifier, a mixer, an oscillator, a DAC, an ADC, and the like.

In addition, the communication unit 310 may include a plurality of transmission/reception paths. Further, the communication unit 310 may include at least one antenna array composed of a plurality of antenna elements. In terms of hardware, the communication unit 310 may be composed of a digital circuit and an analog circuit (e.g., a radio frequency integrated circuit (RFIC)). Here, the digital circuit and the analog circuit can be implemented in one package. In addition, the communication unit 310 may include a plurality of RF chains. Further, the communication unit 310 can perform beamforming.

The communication unit 310 transmits and receives signals as described above. Accordingly, all or some of the communication units 310 may be referred to as a "transmitter", a "receiver", or a "transceiver". In the following description, transmission and reception performed through a wireless channel are used to mean that the processing as described above is performed by the communication unit 310.

The storage unit 320 stores data such as a basic program, an application program, and setting information for the operation of the terminal. The storage unit 320 may include a volatile memory, a nonvolatile memory, or a combination of a volatile memory and a nonvolatile memory. The storage unit 320 provides stored data according to the request of the controller 330.

The controller 330 controls the overall operations of the terminal. For example, the controller 330 transmits and receives signals through the communication unit 310. In addition, the controller 330 records and reads data in the storage unit 320. The controller 330 may perform functions of a protocol stack required by the communication standard. To this end, the controller 330 may include at least one processor or microprocessor, or may be a part of the processor. In addition, a part of the communication unit 310 and the controller 330 may be referred to as a communication processor (CP). According to various embodiments, the controller 330 may control to perform synchronization using a wireless communication network. For example, the controller 330 may control the terminal to perform operations according to various embodiments described below.

Figure 4:
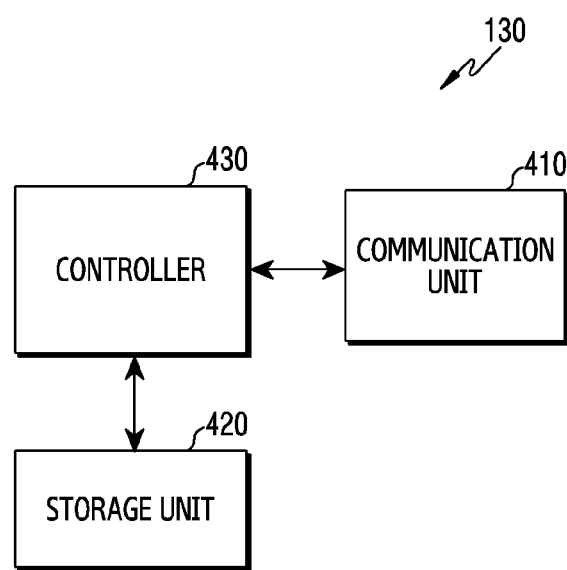
FIG. 4 illustrates a configuration of a core network entity in a wireless communication system according to various embodiments of the disclosure.

FIG. 4 illustrates a configuration of a core network entity in a wireless communication system according to various embodiments of the disclosure. A configuration 130 illustrated in FIG. 4 can be understood as a configuration of an apparatus having at least one function of 130a, 130b, 130c, 130d, 130e, 130f, 130g, and 130h in FIG. 1. The terms used herein such as " . . . unit", " . . . -er (-or)", and the like denote a unit for processing at least one function or operation, and may be implemented by hardware, software, or a combination of hardware and software.

Referring to FIG. 4 above, a core network entity includes a communication unit 410, a storage unit 420, and a controller 430.

The communication unit 410 provides an interface for performing communication with other devices in a network. That is, the communication unit 410 converts a bit string transmitted from the core network entity to another apparatus into a physical signal, and converts the physical signal received from the other apparatus into a bit string. That is, the communication unit 410 can transmit and receive signals. Accordingly, the communication unit 410 may be referred to as a modem, a transmitter, a receiver, or a transceiver. At this time, the communication unit 410 enables the core network entity to communicate with other devices or systems via a backhaul connection (e.g., a wired backhaul or a wireless backhaul) or via a network.

The storage unit 420 stores data such as a basic program, an application program, and setting information for the operation of the core network entity. The storage unit 420 may include a volatile memory, a nonvolatile memory, or a combination of a volatile memory and a nonvolatile memory. The storage unit 420 provides stored data according to the request of the controller 430.

The controller 430 controls the overall operations of the core network entity. For example, the controller 430 transmits and receives signals through the communication unit 410. In addition, the controller 430 records and reads data in the storage unit 420. To this end, the controller 430 may include at least one processor. According to various embodiments, the controller 430 may control to perform synchronization using a wireless communication network. For example, the controller 430 may control the core network entity to perform operations according to various embodiments described below.

Terms referring to connection nodes used in the following description, terms referring to network entities, terms referring to messages, terms referring to interfaces between network entities, terms referring to a variety of identification information, and the like are illustrated for convenience of description. Accordingly, the disclosure is not limited to the following terms, and other terms referring to objects having equivalent technical meanings can be used.

Hereinafter, for convenience of the following description, this disclosure uses terms and names which are defined in a 5G system (5GS) standard and a new radio (NR) standard, which are the most recent standards defined by the 3GPP, among the existing communication standards. However, the disclosure is not limited by the above-mentioned terms and names, and can be equally applied to wireless communication networks conforming to other standards. In particular, this disclosure can be applied to 3GPP 5th generation mobile communication standards (e.g., 5GS and NR).

Figure 5:
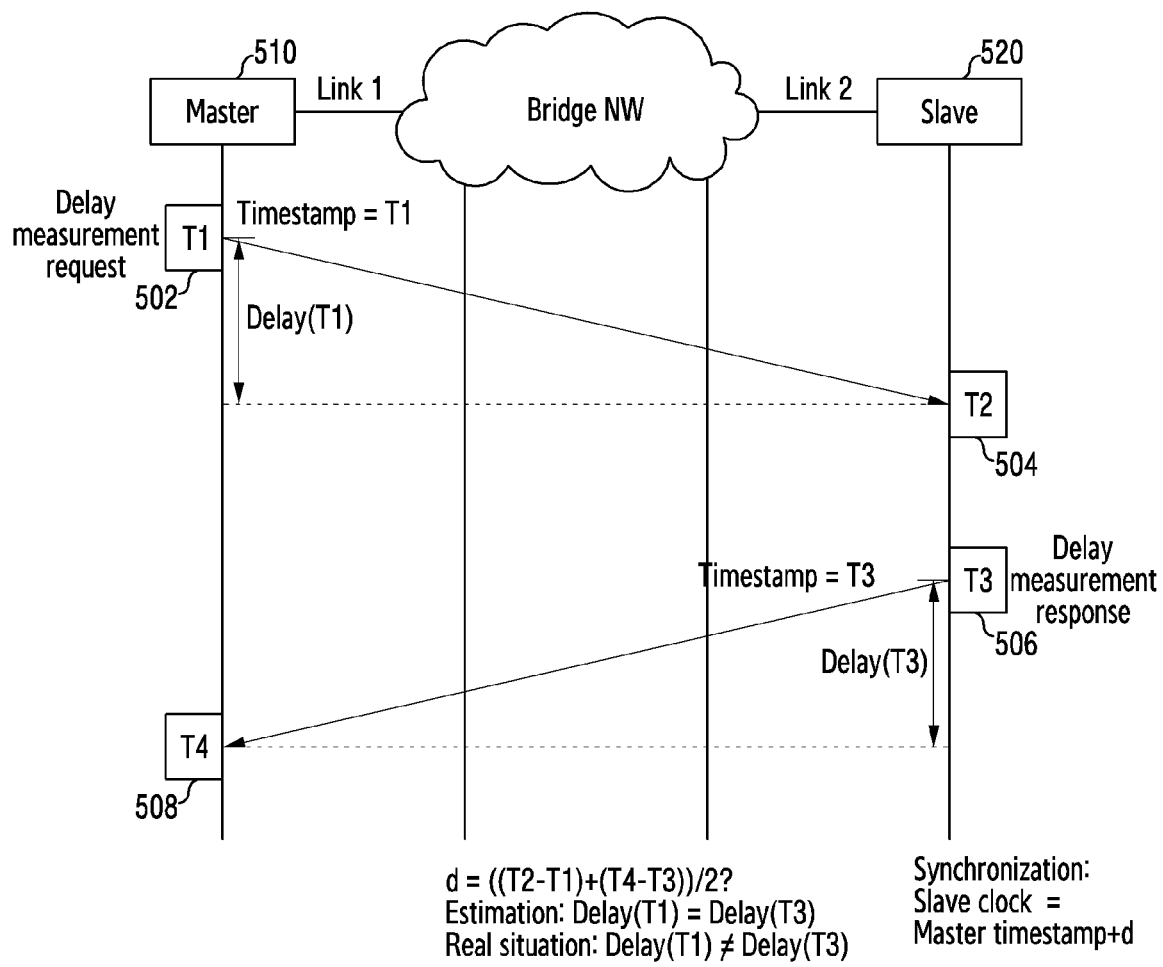
FIG. 5 illustrates clock synchronization in a wired network that does not support a time sensitive network (TSN) in a wireless communication system according to various embodiments of the disclosure.

FIG. 5 illustrates clock synchronization in a wired network that does not support a TSN in a wireless communication system according to various embodiments of the disclosure. The clock synchronization in the wired network can operate based on the IEEE 1588 version (version, v) 1 specification.

Referring to FIG. 5, in various embodiments, a master 510 may refer to a node that provides a reference clock and a slave 520 may refer to a node that performs clock synchronization to adjust its own clock to match the provided reference time. For example, the master 510 and the slave 520 may include an electronic device for communication and an electronic device for factory automation (e.g., a factory computer, a robotic arm, etc.). If a wired network does not support the TSN, delay time estimation between the master 510 and the slave 520 may be inaccurate because a delay time according to a direction is asymmetric. As a result, the accuracy of clock synchronization may be reduced. In various embodiments, the master 510 may transmit, to the slave 520, a delay measurement request Ethernet frame in which a current time (T1) 502 is recorded in a timestamp field to the slave 520. After receiving the Ethernet frame, the slave 520 may allow a time (T2) 504 at which the Ethernet frame was received to be included in a delay measurement response Ethernet frame. The slave 520 may transmit, to the master 510, the delay measurement response Ethernet frame in which a transmission time (T3) 506 of the delay measurement response Ethernet frame is recorded in the timestamp field. The master 510 may receive the delay measurement response Ethernet frame from the slave 520 at a time (T4) 508, and then may average the delay times of the delay measurement request Ethernet frame and the delay measurement response Ethernet frame to estimate a delay time d. At this time, the delay time d may be determined by Equation 1.

$$d=((T2-T1)+(T4-T3))/2 \qquad \text{Equation 1}$$

Referring to Equation 1, d denotes an estimated delay time, T1 denotes a time at which the master 510 transmits a delay measurement request to the slave 520, T2 denotes a time at which the slave 520 receives the delay measurement request from the master 510, T3 denotes a time at which the slave 520 transmits a delay measurement response to the master 510, and T4 denotes a time at which the master 510 receives the delay measurement response from the slave 520. If the delay time d between the master 510 and the slave 520, which is estimated by the master 510, is accurate, the slave 520 may adjust the clock of the slave 520 by adding the estimated delay time d to the timestamp transmitted by the master 510. Thus, clock synchronization between the master 510 and the slave 520 may be obtained. In various embodiments, a delay of each of a link 1 (link 1) and a link 2 (link 2) is a propagation delay, and thus it is symmetrical in a transmission direction. However, a delay through a bridge network (NW) is not symmetrical in the transmission direction because it includes a queuing delay and a processing delay. In various embodiments, each of T1 and T4 may be a time relative to the clock of the master 510, and each of T2 and T3 may be a time relative to the clock of the slave 520. As described above, in various embodiments, clock synchronization may be inaccurate because the delay estimation is inaccurate.

Figure 6:
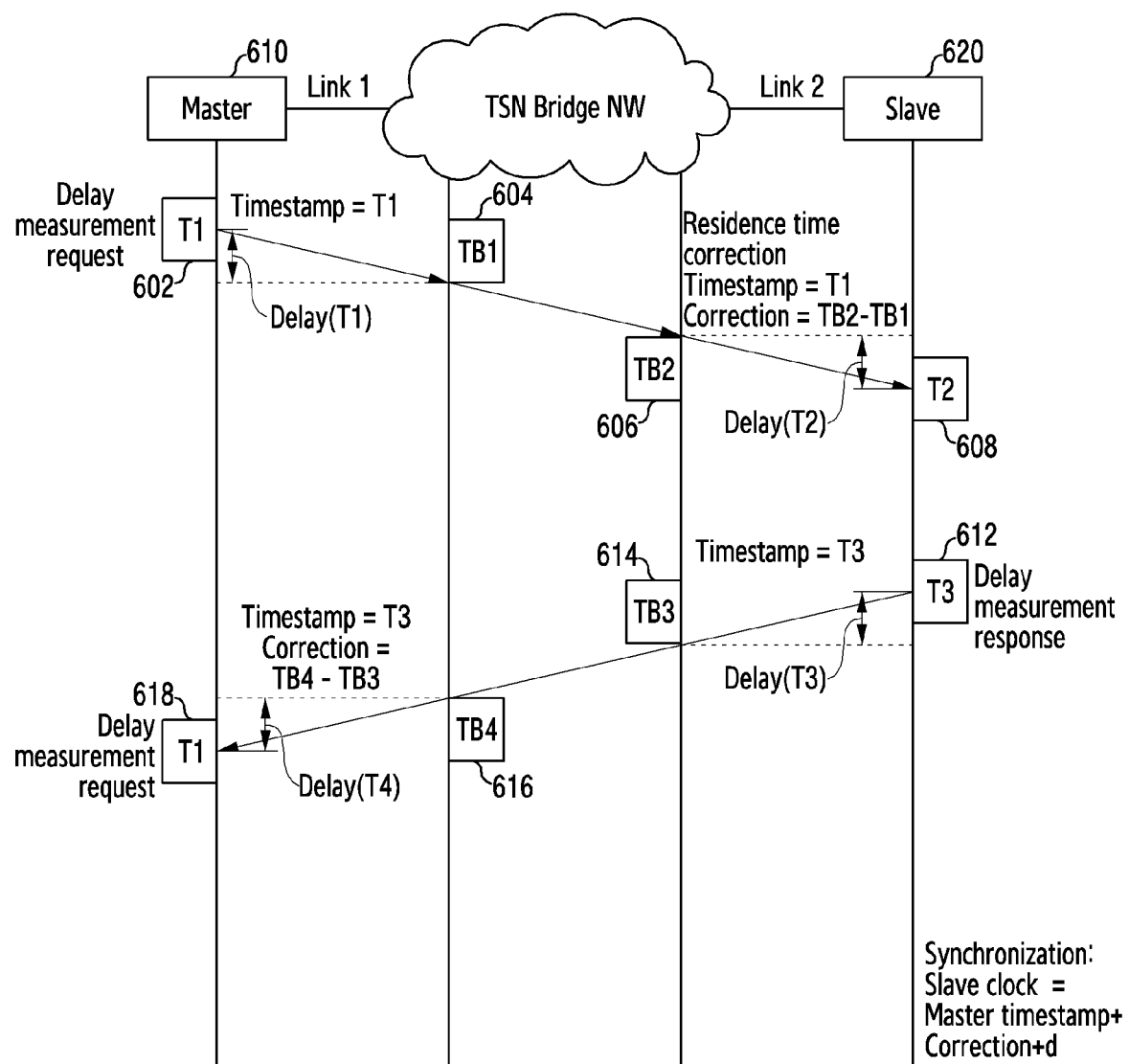
FIG. 6 illustrates clock synchronization in a wired network that supports a TSN in a wireless communication system according to various embodiments of the disclosure.

FIG. 6 illustrates clock synchronization in a wired network that supports a TSN in a wireless communication system according to various embodiments of the disclosure. The clock synchronization of a wired network may operate based on the IEEE 1588 version 2 specification.

Referring to FIG. 6, when a wired network supports a TSN, delay time estimation between the master 610 and the slave 620 becomes more accurate than that when the TSN does not exist, and thus the accuracy of clock synchronization may be enhanced. In various embodiments, a TSN bridge network may provide a residence time correction function. That is, the master 610 may transmit a delay measurement request Ethernet frame to the slave 620 at a time (T1) 602, and then the TSN bridge network may calculate a residence time (TB2-TB1) using a time (TB1) 604 at which the delay measurement request Ethernet frame enters the TSN bridge network and a time (TB2) 606 at which the delay measurement request Ethernet frame leaves the same. The TSN bridge network may record the calculated residence time (TB2-TB) to a correction field of the corresponding Ethernet frame. Since a standby delay and a processing delay during a delay passing through the bridge network are specified in the above-described calculated residence time (TB2-TB1), when the residence time is corrected in a delay time experienced by the Ethernet frame, only a propagation delay which is symmetrical to the transmission direction may remain. In various embodiments, the slave 620 may receive a delay measurement request at a time T2. At a time (T3) 612, the slave 620 may transmit a delay measurement response Ethernet frame to the master 610, and then the TSN bridge network may calculate a residence time (TB4-TB3) using a time (TB3) 614 at which the delay measurement response Ethernet frame of the slave 620 enters the TSN bridge network and a time (TB4) 616 at which the delay measurement response Ethernet frame leaves the same. The TSN bridge network may reflect the calculated residence time (TB4-TB3) in a correction field of the corresponding Ethernet frame. When this residence time (TB4-TB3) is corrected in a delay experienced by the delay measurement response Ethernet frame, only a propagation delay which is symmetrical to the transmission direction may remain. At a time T4 618, the master 610 receives the delay measurement response Ethernet frame from the slave 620, and a delay time d estimated by the master can be determined as shown in Equation 2.

$$d=((T2-(T1+(TB2-TB1)))+(T4-(T3+(TB4-TB3))))/2 \quad \text{Equation 2}$$

Referring to Equation 2, d denotes an estimated delay time, T1 denotes a time at which the master 610 transmits a delay measurement request to the slave 620, T2 denotes a time at which the slave 620 receives the delay measurement request from the master 610, T3 denotes a time at which the slave 620 transmits a delay measurement response to the master 610, and T4 denotes a time at which the master 610 receives the delay measurement response from the slave 620. TB1 denotes a time at which the delay measurement request Ethernet frame enters the TSN bridge network, TB2 denotes a time at which the delay measurement request Ethernet frame leaves the TSN bridge network, TB3 denotes a time at which the delay measurement response Ethernet frame enters the TSN bridge network, and TB4 denotes a time at which the delay measurement response Ethernet frame leaves the TSN bridge network. In various embodiments, the slave 620 may adjust the clock of the slave 620 by adding the estimated delay time d and the correction field to the timestamp transmitted by the master 610. Thus, clock synchronization between the master 610 and the slave 620 may be obtained. As described above, in various embodiments, the TSN may provide residence time delay correction.

Figure 7:
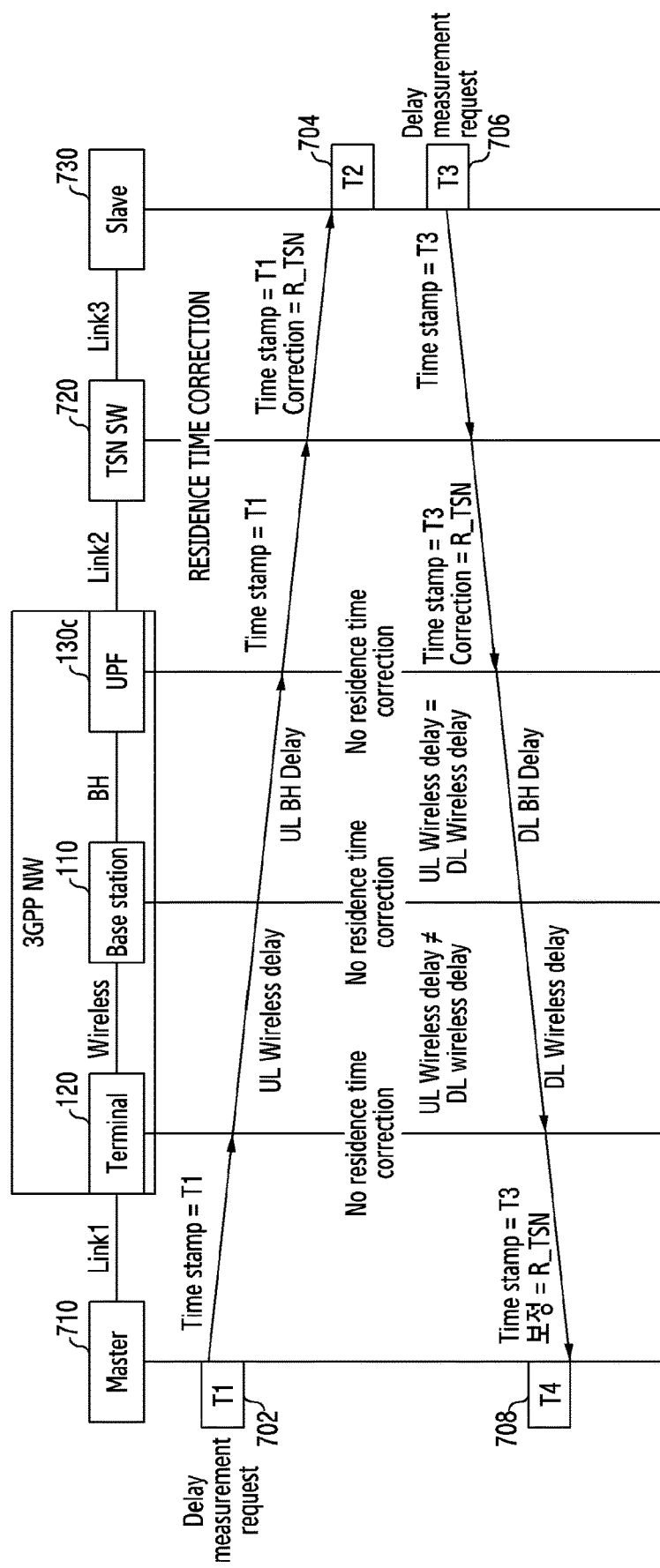
FIG. 7 illustrates a problem of clock synchronization using a wireless communication network in a wireless communication system according to various embodiments of the disclosure.

FIG. 7 illustrates a problem of clock synchronization using a wireless communication network in a wireless communication system according to various embodiments of the disclosure.

Referring to FIG. 7, when a wireless communication network (e.g., 3GPP NW) is used with an Ethernet switch (e.g., a TSN switch (SW)) 720 that provides a TSN function, a problem when clock synchronization is provided may occur. First, a terminal (e.g., UE) 120, a base station (e.g., gNB) 110, and a UPF 130c, which are respective entities of the 3GPP NW, may not provide residence time correction within the respective entities. Second, in an air link between the terminal and the base station, the delay times of an uplink (UL) and a downlink (DL) may be asymmetric. In various embodiments, a master 710 may transmit a delay measurement request to a slave 730 at a time (T1) 702. The TSN SW 720 may perform residence time correction and the slave 730 may receive a delay measurement request at a time (T2) 704. The slave 730 may transmit a delay measurement response to the master 710 at a time (T3) 706. At a time (T4) 708, the master 710 may receive the delay measurement response from the slave 730.

Figure 8:
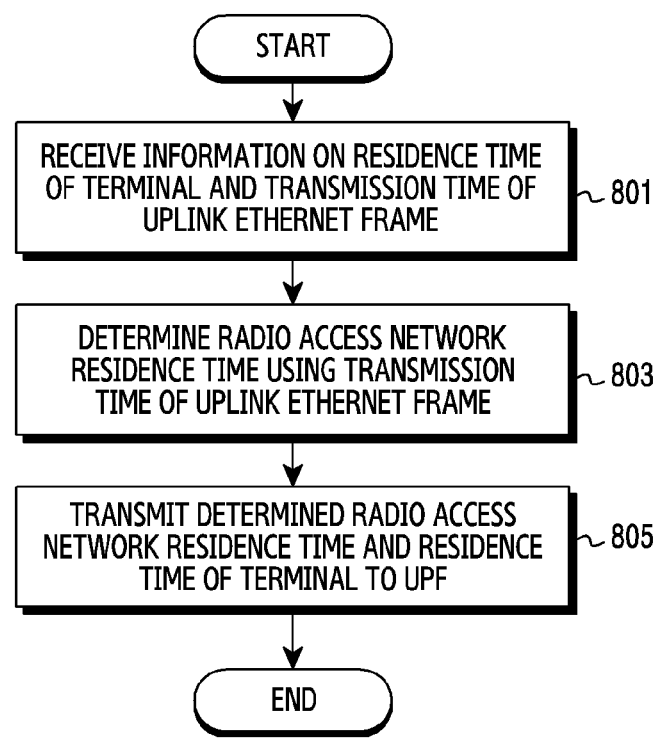
FIG. 8 illustrates a flowchart of a base station in a wireless communication system according to various embodiments of the disclosure.

FIG. 8 illustrates a flowchart of a base station in a wireless communication system according to various embodiments of the disclosure. FIG. 8 illustrates a method of operating the base station 110 at the time of an uplink.

Referring to FIG. 8, in operation 801, the base station may receive, from a terminal, information on a residence time of the terminal and a transmission time of an uplink Ethernet frame. For example, the terminal may calculate a time during which the uplink Ethernet frame stays at the terminal, i.e., a residence time of the terminal, and the base station may receive, from the terminal, information on a residence time of the terminal and a time at which the terminal transmits the uplink Ethernet frame. In various embodiments, the time at which the terminal transmits the uplink Ethernet frame may be included in a service data application protocol (SDAP) and may be transmitted to the base station.

In operation 803, the base station may determine a radio access network residence time using a transmission time of the uplink Ethernet frame. For example, the base station may determine the residence time of the radio access network using the transmission time of the uplink Ethernet frame and a time at which the base station transmits a general packet radio service (GPRS) tunneling protocol-user plane (GTP-U) payload to a UPF.

In operation 805, the base station may transmit the determined radio access network residence time and the residence time of the terminal to the UPF. In various embodiments, the base station may enable the determined residence time of the radio access network to be included in a GTP-U header and may transmit the GTP-U header to the UPF. The UPF may calculate the residence time of the uplink Ethernet frame within a modified wireless communication network using the received residence time of the radio access network, the residence time of the terminal, and the residence time of the uplink Ethernet frame within the UPF, and may reflect the residence time within the modified wireless communication network in a correction field. Thus, a problem of asymmetry of an air link delay in the uplink can be solved.

Figure 9:
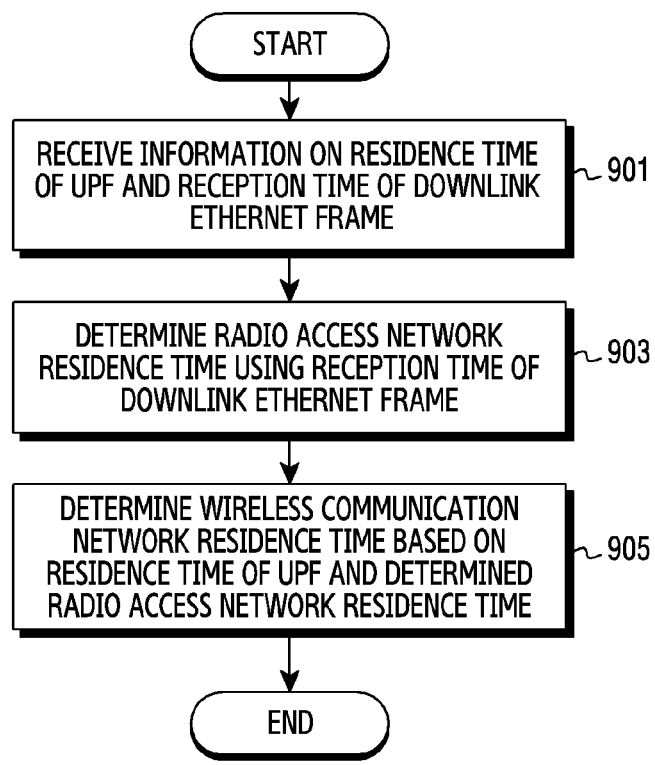
FIG. 9 illustrates a flowchart of a terminal in a wireless communication system according to various embodiments of the disclosure.

FIG. 9 illustrates a flowchart of a terminal in a wireless communication system according to various embodiments of the disclosure. FIG. 9 illustrates a method of operating the terminal 120 at the time of a downlink.

Referring to FIG. 9, in operation 901, a terminal may receive information on a residence time of a UPF and a reception time of a downlink Ethernet frame. For example, the terminal may receive, from a base station, information on the residence time in the UPF of the downlink Ethernet frame and a time at which the base station receives the downlink Ethernet frame from the UPF. In various embodiments, the residence time of the UPF may be included in a GTP-U header and may be transmitted to the base station.

In operation 903, the terminal may determine a radio access network residence time using a reception time of the downlink Ethernet frame. For example, the terminal may determine the residence time of the radio access network using a time at which the base station receives a GTP-U payload from the UPF and a time at which the terminal receives the downlink Ethernet frame from the base station.

In operation 905, the terminal may determine the wireless communication network residence time based on the residence time of the UPF and the determined radio access network residence time. In various embodiments, the terminal may calculate the residence time of the downlink Ethernet frame within the modified wireless communication network using the residence time of the downlink Ethernet frame in the terminal, the residence time of the UPF, and the determined residence time of the radio access network, may reflect the residence time of the modified wireless communication network in a correction field. Thus, a problem of asymmetry of an air link delay in the downlink can be solved.

Figure 10:
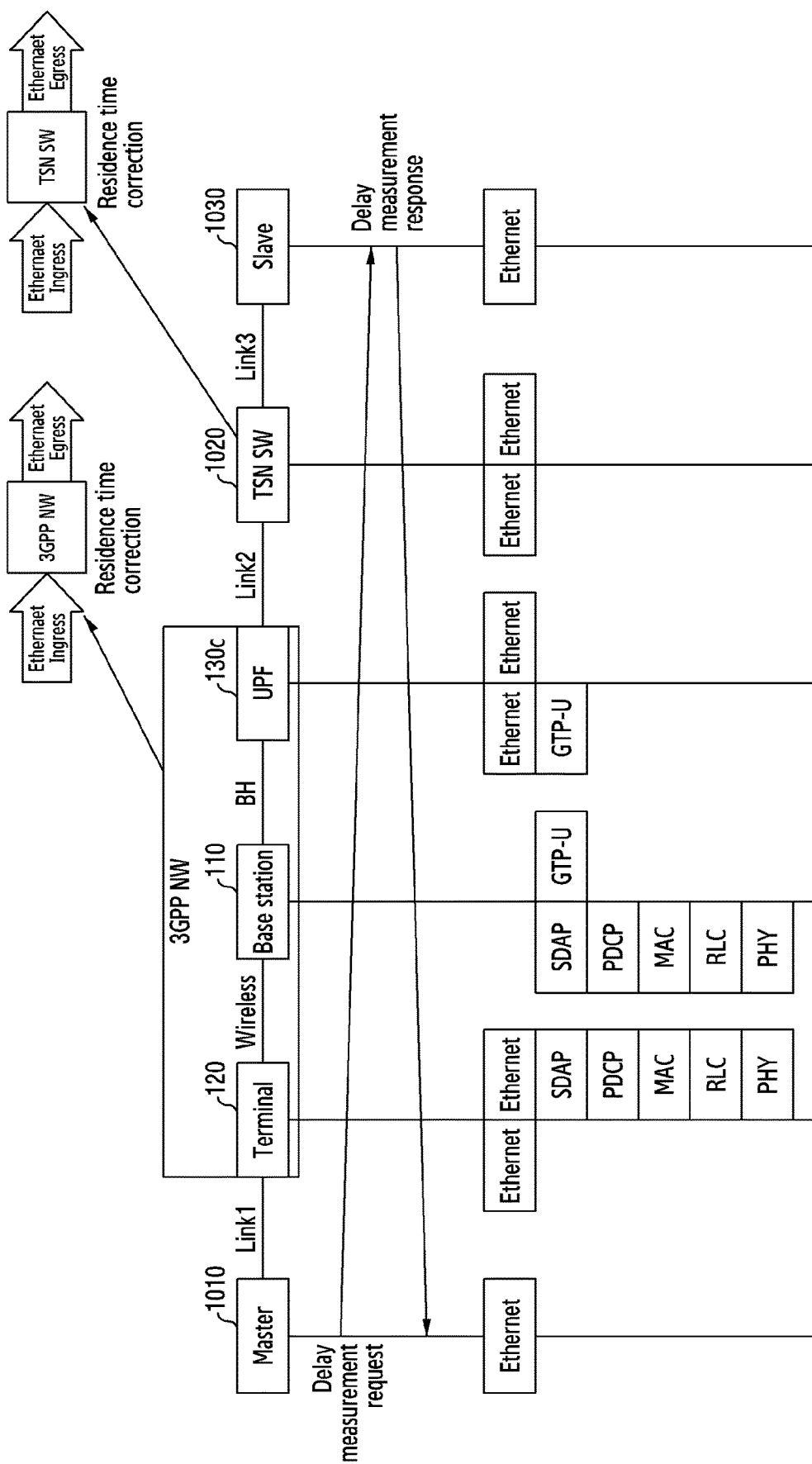
FIG. 10 illustrates a protocol of a wireless communication network for solving a problem of clock synchronization using a wireless communication network in a wireless communication system according to various embodiments of the disclosure.

FIG. 10 illustrates a protocol of a wireless communication network for solving a problem of clock synchronization using a wireless communication network in a wireless communication system according to various embodiments of the disclosure.

Referring to FIG. 10, an Ethernet frame enters a wireless communication network through the terminal 120, and then the terminal 120 and the base station 110 may be processed by an SDAP and a packet data convergence protocol (PDCP). The base station 110 may not read or modify the Ethernet frame. In addition, communication between the terminal 120 and the base station 110 may be performed using a media access control (MAC)/radio link control (RLC)/physical layer (PHY) frame synchronized with the clock of the base station 110. The base station 110 and the UPF 130c may communicate with each other using a GTP-U, and the UPF 130c may also not read or modify the Ethernet frame directly. In the UPF 130c, the Ethernet frame can escape from a wireless communication network. Even in an Ethernet switch (TSN SW) 1020 that supports a TSN, the Ethernet frame may also enter from outside. The entering Ethernet frame may be internally processed and may then go out again. Therefore, the wireless communication network may be modeled as an Ethernet switch supporting one TSN. In various embodiments, residence time correction may be performed on the Ethernet frame that has entered the interior of the wireless communication network. In various embodiments, the master 1010 may transmit a delay measurement request to the slave 1030. The slave 1030 receiving the delay measurement request may transmit a delay measurement response to the master 1010.

Figure 11:
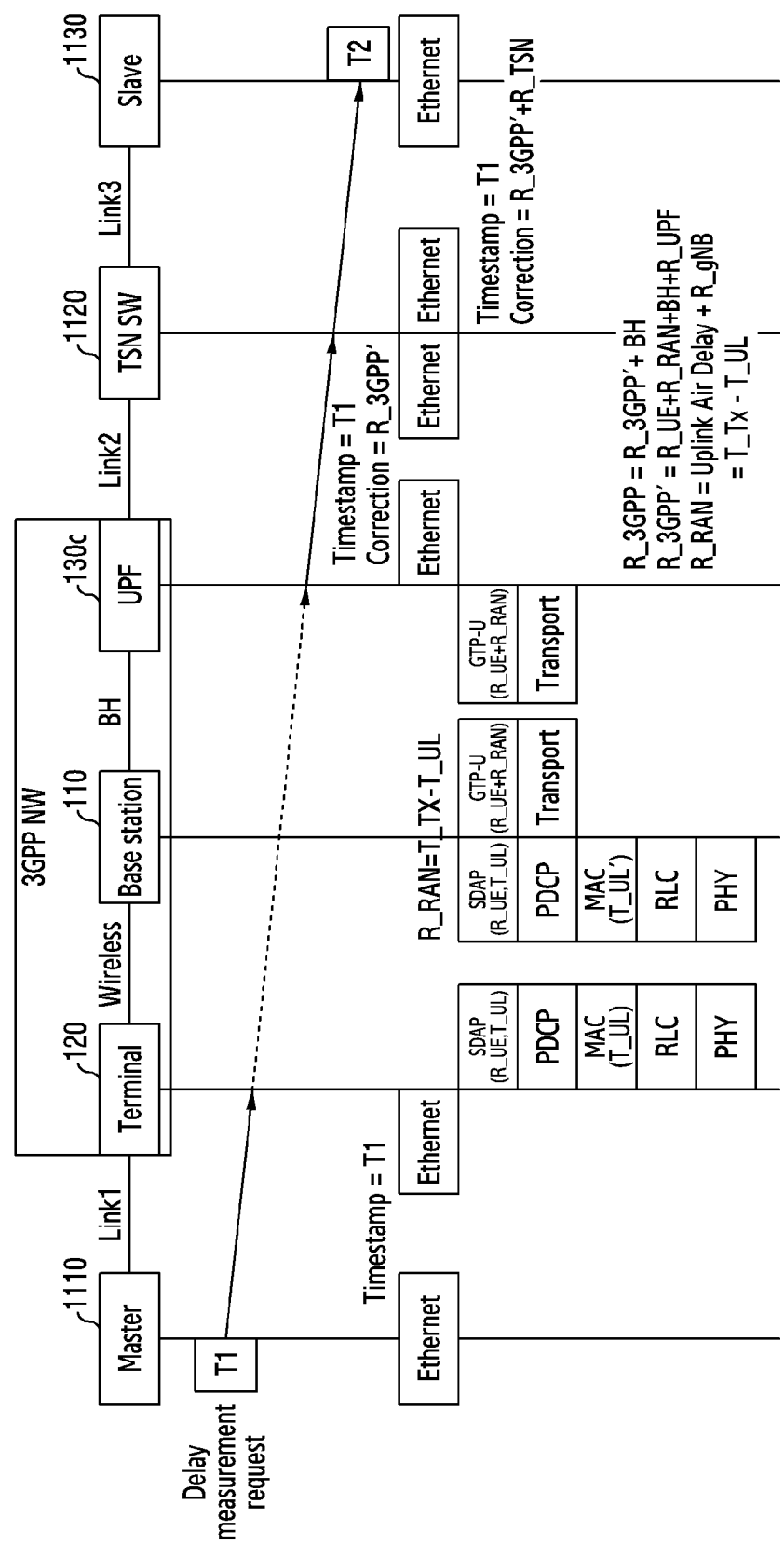
FIG. 11 illustrates a synchronization method in an uplink in a wireless communication system according to various embodiments of the disclosure.

FIG. 11 illustrates a synchronization method in an uplink in a wireless communication system according to various embodiments of the disclosure.

Referring to FIG. 11, the terminal 120, the base station 110, and the UPF 130c may perform residence time correction for each entity. Each entity may calculate a time during which an uplink Ethernet stays in each entity as R (residence time)_UE, R_gNB, and R_UPF. The terminal 120 may enable R_UE and a time (T)_UL at which the uplink Ethernet is transmitted to the base station 110 to be included in the SDAP, and may transmit the SDAP to the base station 110. In various embodiments, T_UL may be determined using an MAC/RLC/PHY frame time commonly known by the base station 110 and the terminal 120. That is, the frame time of MAC/RLC/PHY at the time when the terminal 120 transmits the uplink Ethernet may be recorded as T_UL. The base station 110 may calculate a residence time R_RAN of a radio access network by summing a delay time of an uplink air link and a residence time of the base station 110. When a time at which the base station 110 transmits the GTP-U payload to the UPF 130c is T_TX, R_RAN may be calculated as Equation 3.

$$R\_RAN = T\_TX - T\_UL \qquad \text{Equation 3}$$

Referring to Equation 3, R_RAN denotes a residence time of a radio access network, T_TX denotes a time at which the base station 110 transmits a GTU-U payload to the UPF 130c, and T_UL denotes a frame time when the terminal 120 transmits the uplink Ethernet. The base station 110 may enable an R_RAN value to be included in the GTP-U header and may transmit the GTP-U header to the UPF 130c. Since the UPF 130c is a place where an Ethernet frame escapes the wireless communication network, the UPF 130c has to reflect a residence time R_3GPP in the wireless communication network in a correction field. The residence time R_3GPP in the wireless communication network may be calculated by Equation 4.

$$R\_3GPP = R\_UE + R\_RAN + B + R\_UPF \qquad \text{Equation 4}$$

Referring to Equation 4, R_3GPP denotes a residence time within a wireless communication network, R_UE denotes a residence time within the terminal 120, R_RAN denotes a residence time of a radio access network, BH denotes a backhaul delay time, and R_UPF denotes a residence time within the UPF 130c. R_3GPP is a value obtained by adding both the residence time within the entity and the delay time in a radio link and a backhaul link. In various embodiments, the delay time of the radio link between the terminal 120 and the base station 110 may not be symmetrical in a transmission direction. However, in various embodiments, the backhaul link between the base station 110 and the UPF 130c may be composed of a wired network, and this link may be assumed to be a link with only a propagation delay. Therefore, the delay time of the backhaul link may be symmetrical in the transmission direction. In various embodiments, a residence time R 3GPP' within a modified wireless communication network excluding the delay time of the backhaul link that is symmetrical to the transmission direction may be calculated as Equation 5.

$$R\_3GPP' = R\_UE + R\_RAN + R\_UPF \qquad \text{Equation 5}$$

Referring to Equation 5, R_3GPP' denotes a residence time within a modified wireless communication network, R_UE denotes a residence time of the terminal 120, R_RAN denotes a residence time of a radio access network, and R_UPF denotes a residence time within the UPF 130c. In various embodiments, the UPF 130c may update a calculated R_3GPP' in a correction field before transmitting the Ethernet frame to the outside. In various embodiments, T_UL denotes a PHY frame time when the terminal 120 transmits the uplink Ethernet to a radio link. At this time, the PHY frame may be synchronized with a global positioning system (GPS) time of the base station 110. In various embodiments, T_UL' denotes a PHY frame time when the base station 110 receives the uplink Ethernet from a radio link. At this time, the PHY frame may be synchronized with the GPS time of the base station 110. In various embodiments, the base station 110 may be connected to the GPS system. Thus, T_TX denotes the GPS time when the base station 110 transmits the GTP-U payload to the UPF 130c. As described above, residence time correction may be performed on the terminal 120, the base station 110, and the UPF 130c. In order to solve asymmetry problems of uplink and downlink radio link delays, the uplink and downlink radio link delays may be delivered. For example, the uplink radio link delay may be delivered via the GTP-U, and the downlink radio link delay may be delivered via the SDAP and the MAC. In various embodiments, the master 1110 may transmit a delay measurement request to the slave 1130. The delay measurement request transmitted by a master base station 1110 may be corrected in the UPF 130c and the TSN SW 1120.

Figure 12:
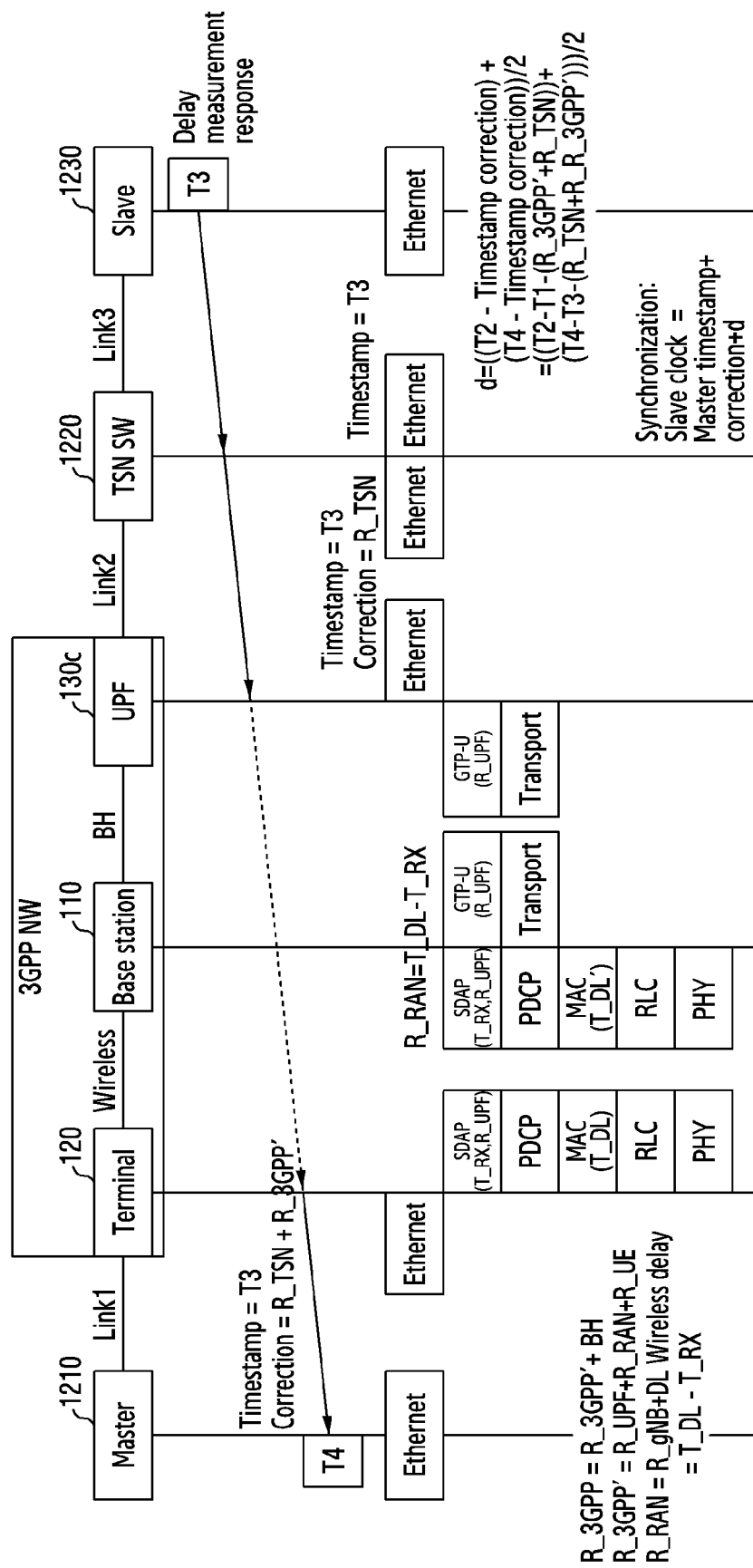
FIG. 12 illustrates a synchronization method in a downlink in a wireless communication system according to various embodiments of the disclosure.

FIG. 12 illustrates a synchronization method in a downlink in a wireless communication system according to various embodiments of the disclosure.

Referring to FIG. 12, each entity in a wireless communication network may perform residence time correction even on a delay measurement response Ethernet frame in a similar manner to a case of an uplink. In various embodiments, the UPF 130c may enable a residence time of a downlink Ethernet within the UPF 130c to be included in the GTP-U header and may transmit the GTP-U to the base station 110. The base station 110 may record a received time T_RX in the GTP-U and may enable T_RX to be included in the SDAP to transmit the SDAP to the terminal 120. The terminal 110 may calculate the residence time R_RAN of the radio link as shown in Equation 6 after obtaining the time T_DL at which the corresponding frame is received in the downlink on the basis of the MAC/RLC/PHY frame time.

$$R\_RAN = T\_DL - T\_RX \qquad \text{Equation 6}$$

Referring to Equation 6, R_RAN denotes a residence time of a radio link, T_DL denotes a frame time when the terminal 120 receives a downlink Ethernet, and T_RX denotes a time at which the base station 110 receives the GTP-U payload from the UPF 130c. In various embodiments, a residence time R_3GPP' within a modified wireless communication network may be calculated as shown in Equation 7 by reflecting the residence time in the terminal 120 at the time when the terminal 120 transmits a delay measurement response Ethernet frame to the outside.

$$R\_3GPP' = R\_UE + R\_RAN + R\_UPF \qquad \text{Equation 7}$$

Referring to Equation 7, R_3GPP' denotes a residence time within the modified wireless communication network, R_UE denotes a residence time within the terminal 120, R_RAN denotes a residence time of the radio access network, and R_UPF denotes a residence time within the UPF 130c. In various embodiments, the terminal 120 may add the calculated R_3GPP' to the correction field. In various embodiments, the slave 1230 may perform synchronization with the master 1210 based on a master timestamp received from the master 1210, a correction value, and a delay time d.

In various embodiments, T_DL denotes a PHY frame time when the terminal 120 receives an Ethernet from a radio link. At this time, the PHY frame may be synchronized with the GPS time of the base station 110. T_DL' denotes a PHY frame time when the base station 110 transmits a downlink Ethernet to the radio link. At this time, the PHY frame may be synchronized with the GPS time of the base station 110. T_RX denotes a base station time at which the base station 110 receives the GTP-U payload from the UPF 130c. As described above, residence time correction may be performed on the terminal 120, the base station 110, and the UPF 130c. In order to solve asymmetry problems of uplink and downlink radio link delays, the uplink and downlink radio link delays may be delivered. For example, the uplink radio link delay may be delivered via the GTP-U, and the downlink radio link delay may be delivered via the SDAP and the MAC. In various embodiments, the slave 1230 may transmit a delay measurement response to the master 1210. The TSN SW 1220 may record a timestamp T3 of a time at which the delay measurement response passes.

A clock synchronization procedure in a network supporting 802.1 AS has the same basic principle as the above-mentioned clock synchronization procedure in IEEE 1588, but there are procedural differences therebetween. For example, a procedure for measuring a periodic link delay time between two adjacent TSN systems (e.g., an end-station or a bridge) and a procedure for updating a correction field including a residence time in a bridge may be included in the above-mentioned different procedures. In various embodiments, an end-station may refer to a node that can act as a master or a slave. Hereinafter, FIGS. 13 and 14 describe a specific operation method for the above-described procedures.

Figure 13:
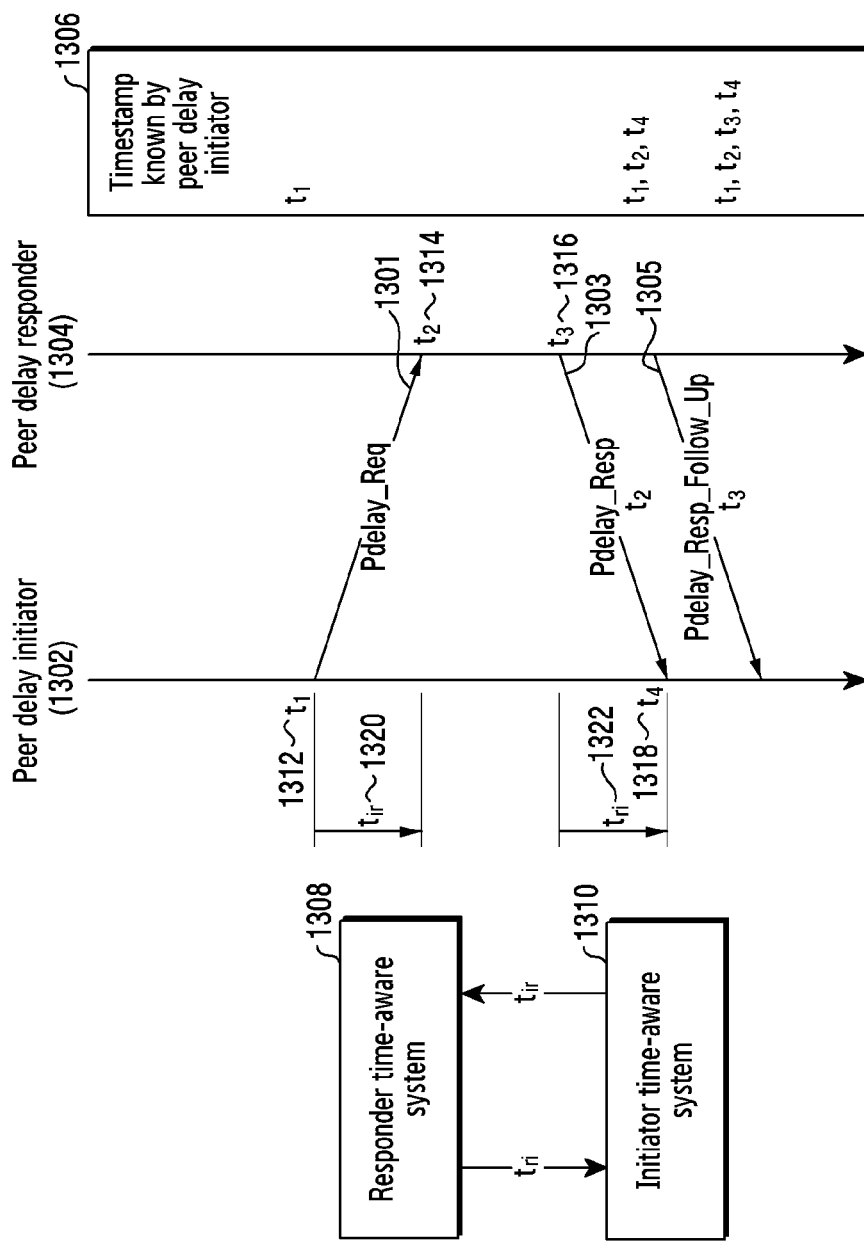
FIG. 13 illustrates a method for measuring a delay time between adjacent TSN systems in a wireless communication system according to various embodiments of the disclosure.

FIG. 13 illustrates a method for measuring a delay time between adjacent TSN systems in a wireless communication system according to various embodiments of the disclosure.

Referring to FIG. 13, a peer delay initiator 1302 requests delay time measurement, and a peer delay responder 1304 receives the request for delay time measurement. In various embodiments, the peer delay initiator may refer to a node requesting delay time measurement, and the peer delay responder may refer to a node receiving the request for delay time measurement. The peer delay initiator and the peer delay responders may also refer to different TSN systems. For example, the peer delay initiator and the peer delay responder may refer to a bridge and a bridge, a bridge and a master, and a bridge and a slave, respectively.

In operation 1301, the peer delay initiator 1302 may transmit, to the peer delay responder 1304, a Pdelay_Req Ethernet frame requesting delay time measurement from the peer delay responder 1304 at a time ($t_1$) 1312. The peer delay responder 1304 may receive the Pdelay_Req Ethernet frame at a time ($t_2$) 1314 and may store the time ($t_2$) 1314 when the frame is received. In various embodiments, a time ($t_{ir}$) 1320 may refer to a difference between the time ($t_1$) 1312 and the time ($t_2$) 1314.

In operation 1303, the peer delay responder 1304 may transmit the Pdelay_Resp Ethernet frame containing information about the stored time ($t_2$) 1314 to the peer delay initiator 1302 at a time ($t_3$) 1316. Next, the peer delay responder 1304 may store the time ($t_3$) 1316 at which the Pdelay_Resp Ethernet frame is transmitted.

In operation 1305, the peer delay responder 1304 may transmit, to the peer delay initiator 1302, a Pdelay_Resp_Follow_Up Ethernet frame including information about the stored time ($t_3$) 1316. The peer delay initiator 1302 may receive the Pdelay_Resp Ethernet frame at a time ($t_4$). Next, the peer delay initiator 1302 may receive the Pdelay_Resp_Follow_Up Ethernet frame. The peer delay initiator 1302 may be aware of the time ($t_2$) 1314 and the time ($t_3$) 1316 by identifying the Pdelay_Resp Ethernet frame and the Pdelay_Resp_Follow_Up Ethernet frame. The peer delay initiator 1302 may determine a delay time D between adjacent TSN systems using the time ($t_1$) 1312, the time ($t_2$) 1314, the time ($t_3$) 1316, and the time ($t_4$) 1318 described above. The delay time D between adjacent TSN systems may be defined as Equation 8 below.

$$D = ((t_2 - t_1) + (t_4 - t_3))/2 \qquad \text{Equation 8}$$

Referring to Equation 8, D denotes a delay time between adjacent TSN systems, $t_1$ denotes a time at which the peer delay initiator 1302 requests delay time measurement from the peer delay responder 1304, $t_2$ denotes a time at which the peer delay responder 1304 receives the Pdelay_Req Ethernet frame from the peer delay initiator 1302, $t_3$ denotes a time at which the peer delay responder 1304 transmits the Pdelay_Resp Ethernet frame to the peer delay initiator 1302, and $t_4$ denotes a time at which the peer delay initiator 1302 receives the Pdelay_Resp Ethernet frame from the peer delay responder 1304. In various embodiments, a time ($t_{ri}$) 1322 denotes a difference between the time ($t_3$) 1316 and the time ($t_4$) 1318. In various embodiments, the delay time between the adjacent TSN systems described above may be determined as an average of the time ($t_{ir}$) 1320 and the time ($t_{ri}$) 1322, where the average of the time ($t_{ir}$) 1320 and the time ($t_{ri}$) 1322 may be represented by a mean path delay (meanPathDelay). In various embodiments, when an initiator time-aware system 1310 transmits a signal to a responder time-aware system 1308, a delay may occur by the time ($t_{ir}$) 1320. Also, when the responder time-aware system 1308 transmits a signal to the initiator time-aware system 1310, a delay may occur by the time ($t_{ri}$) 1322. In various embodiments, the time ($t_{ir}$) 1320 may be determined by a difference between a mean path delay and a delay asymmetry value (meanPathDelay−delayAsymmetry). Also, the time ($t_{ri}$) 1322 may be determined by a sum of the mean path delay and the delay asymmetry value (meanPathDelay+delayAsymmetry). In various embodiments, the peer delay responder 1304 may store a timestamp 1306 known by the peer delay initiator 1302. For example, the timestamp 1306 known by the peer delay initiator 1302 may include $t_1$, and $t_1$, $t_2$, $t_4$, and $t_1$, $t_2$, $t_3$, $t_4$. In various embodiments, the delay time between the adjacent TSN systems described above may be periodically calculated according to a predetermined period. At this time, neighborRateRatio between the TSN systems may be calculated together with the calculation of the periodic delay time. For example, neighborRateRatio may be determined through a radio ((local clock frequency i)/(local clock frequency r)) of a local clock frequency i of the peer delay initiator 1302 and a local clock frequency r of the peer delay responder 1304. In various embodiments, the local clock frequency may refer to a unique oscillation frequency, an inverse of the period, etc., of the corresponding TSN system.

Figure 14:
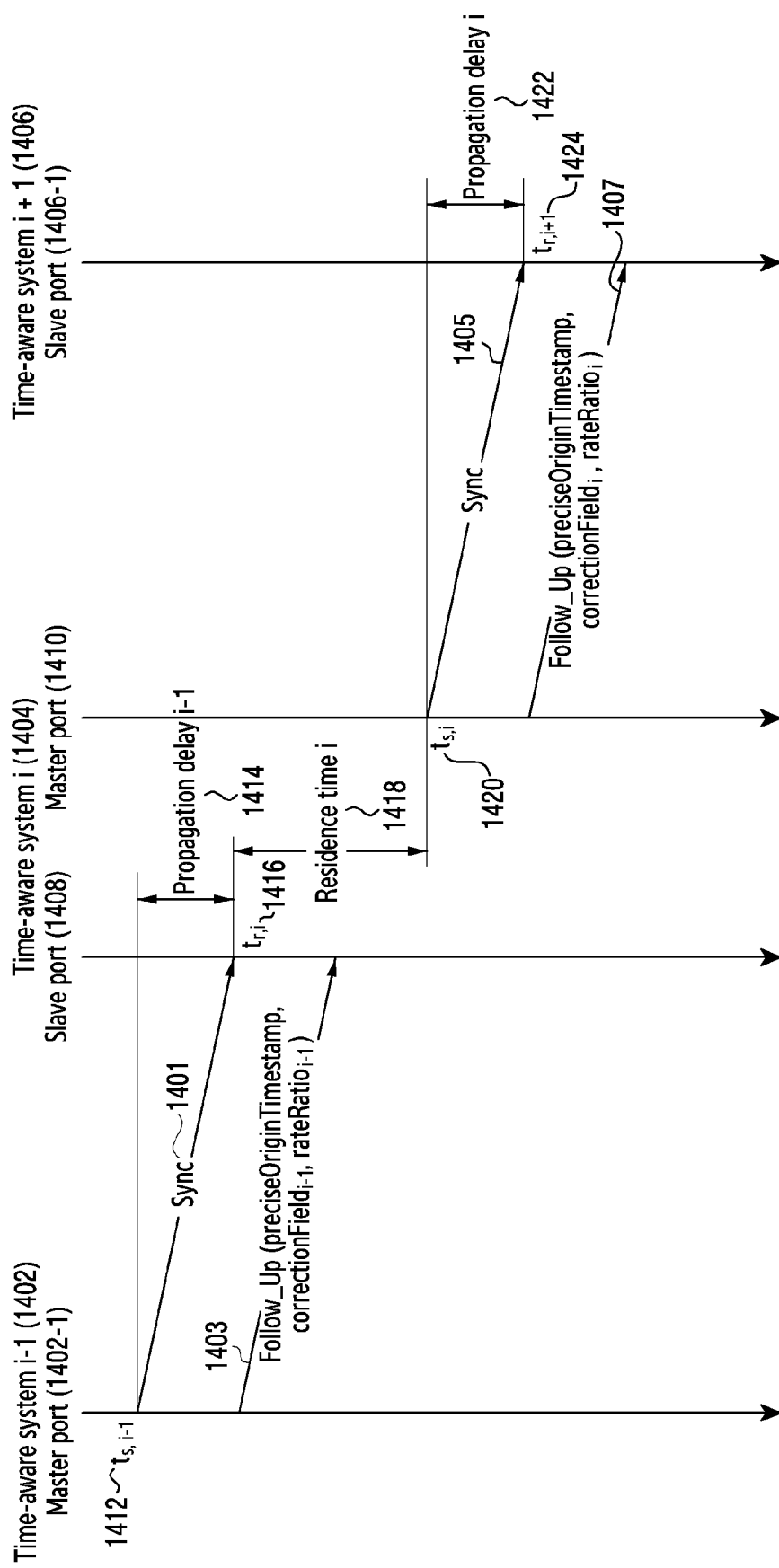
FIG. 14 illustrates a clock synchronization method between TSN systems in a wireless communication system according to various embodiments of the disclosure.

FIG. 14 illustrates a clock synchronization method between TSN systems in a wireless communication system according to various embodiments of the disclosure.

Referring to FIG. 14, a time-aware system may refer to a TSN system. In operation 1401, a master port 1402-1 of a time-aware system i−1 1402 may transmit an Sync frame to a slave port 1408 of a time-aware system i 1404 at a time $(t_{s,\ i-1})$ 1412. The slave port 1408 may receive the above described Sync frame at a time $(t_{r,\ i})$ 1416. Here, a difference between the time $(t_{s,\ i-1})$ 1412 and the time $(t_{r,\ i})$ 1416 may refer to a propagation delay i−1 1414 between the TSN system i−1 1402 and the TSN system i 1404.

In operation 1403, the master port 1402-1 of the time-aware system i−1 1402 may transmit a Follow_Up frame to the slave port 1408 of the time-aware system i 1404. At this time, the Follow_Up frame may include preciseOriginTimestamp, correctionFieldi−1, and rateRatioi−1 parameters. Here, the preciseOriginTimestamp may indicate a time at which a Grandmaster in a TSN domain transmits the Sync frame. correctionFieldi−i may indicate a value reflecting a difference between the preciseOriginTimestamp and the time at which the TSN system i−1 1402 transmits the Sync frame. rateRatioi-1 indicates a ratio of a clock frequency of the Grandmaster to a clock frequency of the TSN system i−1 1402, and may be calculated as (Grandmaster Clock Frequency)/(Local Clock Frequency i−1). In various embodiments, the Grandmaster may indicate a master node that first transmits the Sync frame for clock synchronization in the TSN system.

In operation 1405, the master port 1410 of the time-aware system i 1404 may transmit the Sync frame at the time $(t_{s,\ i})$ 1420 to the slave port 1406-1 of the time-aware system i+1 1406. The slave port 1406-1 may receive the above-described Sync frame at a time $(t_{r,\ i+1})$ 1424. A difference between the time $(t_{s,\ i})$ 1420 and the time $(t_{r,\ i+1})$ 1424 may refer to a propagation delay i 1422 of the TSN system i 1404 and the TSN system i+1 1406.

In operation 1407, the master port 1410 of the time-aware system i may transmit the Follow_Up frame to the slave port 1406-1 of the time-aware system i+1 1406. At this time, the Follow_Up frame may include preciseOriginTimestamp, correctionFieldi, and rateRatio parameters. Here, correctionFieldi and rateRatioi may be values calculated by the time-aware system i 1404. correctionFieldi may be calculated as correctionFieldi=correctionFieldi−1+LinkDelayi−1+ResidenceTimei. Here, LinkDelayi−1 denotes a delay time D between the TSN systems described in FIG. 13, and may denote a value that is periodically calculated according to a predetermined period and stored as an average value. Also, LinkDelayi−1 may refer to a propagation delay i−1. In various embodiments, a residence time i 1418 denotes a time to stay in the TSN system i 1404. The residence time i 1418 may indicate a difference between a time $(t_{r,\ i})$ 1416 at which the TSN system i 1404 receives the Sync frame and the time $(T_{s,\ i})$ 1420 at which the TSN system i 1404 transmits the Sync frame to the TSN system i+1 1406. Also, rateRatioi denotes a ratio of a local clock frequency of the TSN system i 1404 and the TSN system i+1 1406, and may be calculated as rateRatioi=rateRatioi−1×(Local Clock Frequencyi−1)/(Local Clock Frequencyi). Here, (Local Clock Frequency i−1)/(Local Clock Frequency i) may refer to a value that is calculated as neighborRateRatio and continuously updated at the time of measuring a periodic delay time in FIG. 13. Generally, when an Ethernet LAN is constructed, a value of a link delay is several hundred ns, and rateRatio is close to 1, but the residence time is allowed up to 10 ms. Therefore, it is most important that the TSN system accurately delivers the value of the residence time. In various embodiments, the rateRatio may be a value with a difference of less than 200 bpm based on 1.

Figure 15:
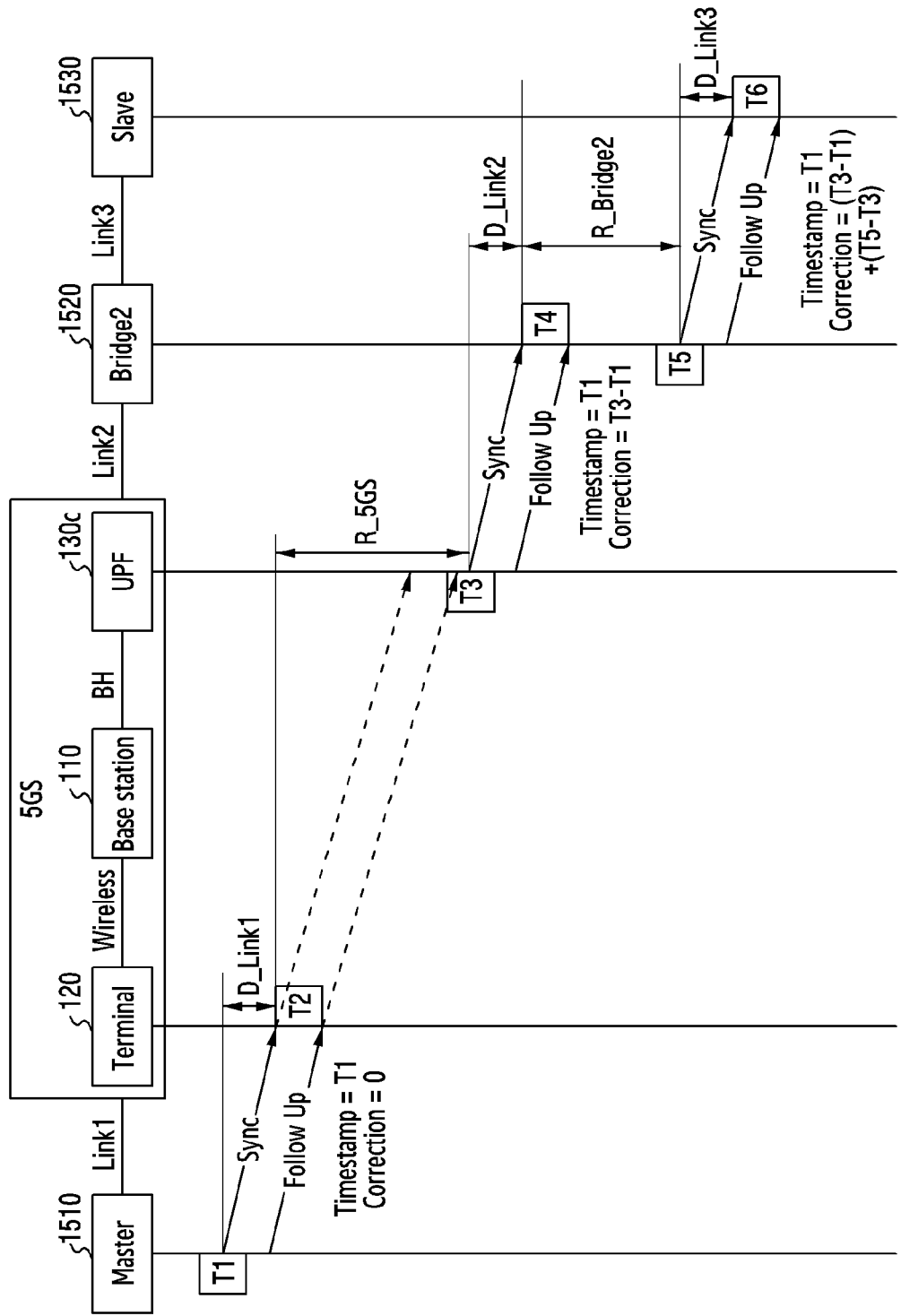
FIG. 15 illustrates a clock synchronization method of a TSN bridge model in a wireless communication system according to various embodiments of the disclosure.

FIG. 15 illustrates a clock synchronization method of a TSN bridge model in a wireless communication system according to various embodiments of the disclosure.

Figure 16:
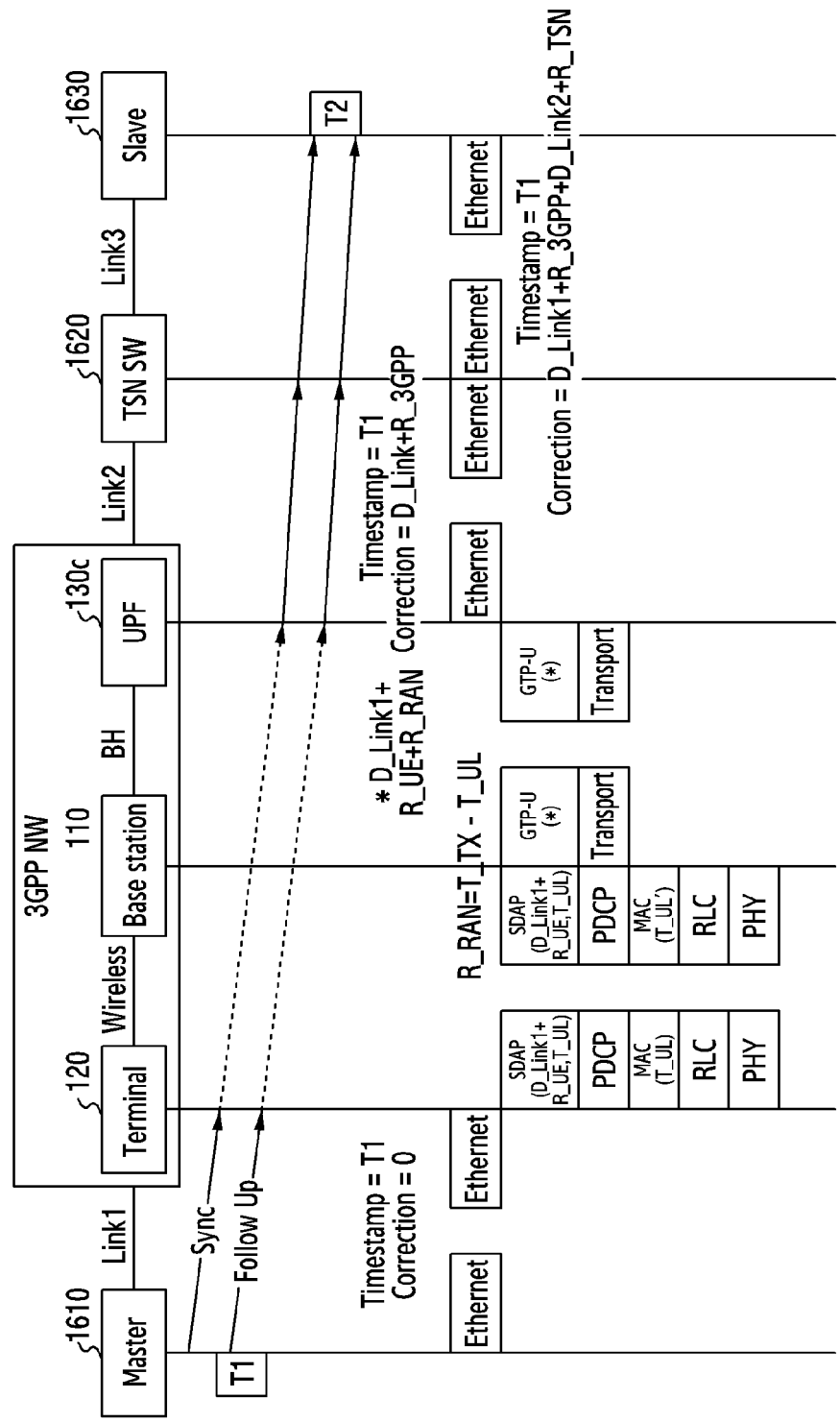
FIG. 16 illustrates a clock synchronization method in an uplink in a wireless communication system according to various embodiments of the disclosure.

Referring to FIG. 15, the terminal 120 may perform periodic delay time measurement on a link shared with an adjacent TSN system. That is, the terminal 120 periodically measures a link 1 delay D_Link1 and the UPF 130*c* periodically measures a link 2 delay D_Link2 to store the measured value as an average value. In FIG. 15, when a 5G system including the terminal 120, the base station 110, and the UPF 130*c* transmits a Sync frame and a Follow_Up frame to an adjacent bridge 2 1520, the link delay and R_5GS which is a time of staying in the 5G system may be updated in a correction field. At this time, a wireless delay between the terminal 120 and the base station 110 in the 5G system and a backhaul (BH) delay between the base station 110 and the UPF 130*c* may be assumed to be fixed and symmetric values by applying a predetermined delay QoS class. In various embodiments, the R_5GS described above may be calculated through the residence time in the terminal 120, the base station 110, and the UPF 130*c* within the 5G system link and a sum of the wireless delay and the backhaul delay. For example, the 5G system may confirm that the value of the correction field is T3−T1 by updating the link 1 delay and the R_5GS in the correction field in the Sync frame. In various embodiments, the master 1510 may transmit the Sync frame at the time T1 to the terminal 120 included in the 5G system. Next, the master 1510 may transmit the Follow_Up frame. At this time, the link 1 delay D_Link1 may mean a difference between the time T1 at which the master 1510 transmits the Sync frame and the time T2 at which the terminal 120 receives the Sync frame. Next, the timestamp may be set to T1, and the correction field may be set to zero. The UPF 130*c* may transmit the Sync frame to the bridge 2 1520 at the time T3. The bridge 2 1520 may receive the Sync frame at the time T4. Next, the UPF 130*c* may also transmit the Follow_Up frame. At this time, a difference between T2 and T3 may refer to R_5GS. Also, a difference between T3 and T4 may refer to a link 2 delay (D_Link2). Here, the timestamp may be set to T1, and the correction field may be set to T3−T1. The bridge 2 1520 may transmit the Sync frame to the slave 1530 at a time T5. The slave 1530 may receive the Sync frame at a time T6. At this time, a difference between T4 and T5 may refer to a residence time R Bridge2 of the bridge 2 1520. Next, the bridge 2 1520 may also transmit the Follow_Up frame. At this time, a difference between T5 and T6 may refer to a link 3 delay (D_Link3). Here, the timestamp may be set to T1 and the correction field may be set to (T3−T1)+(T5−T3). FIG. 16 to be described later shows a clock synchronization process using an uplink in a network supporting IEEE 802.1AS and a 3GPP network.

Figure 17:
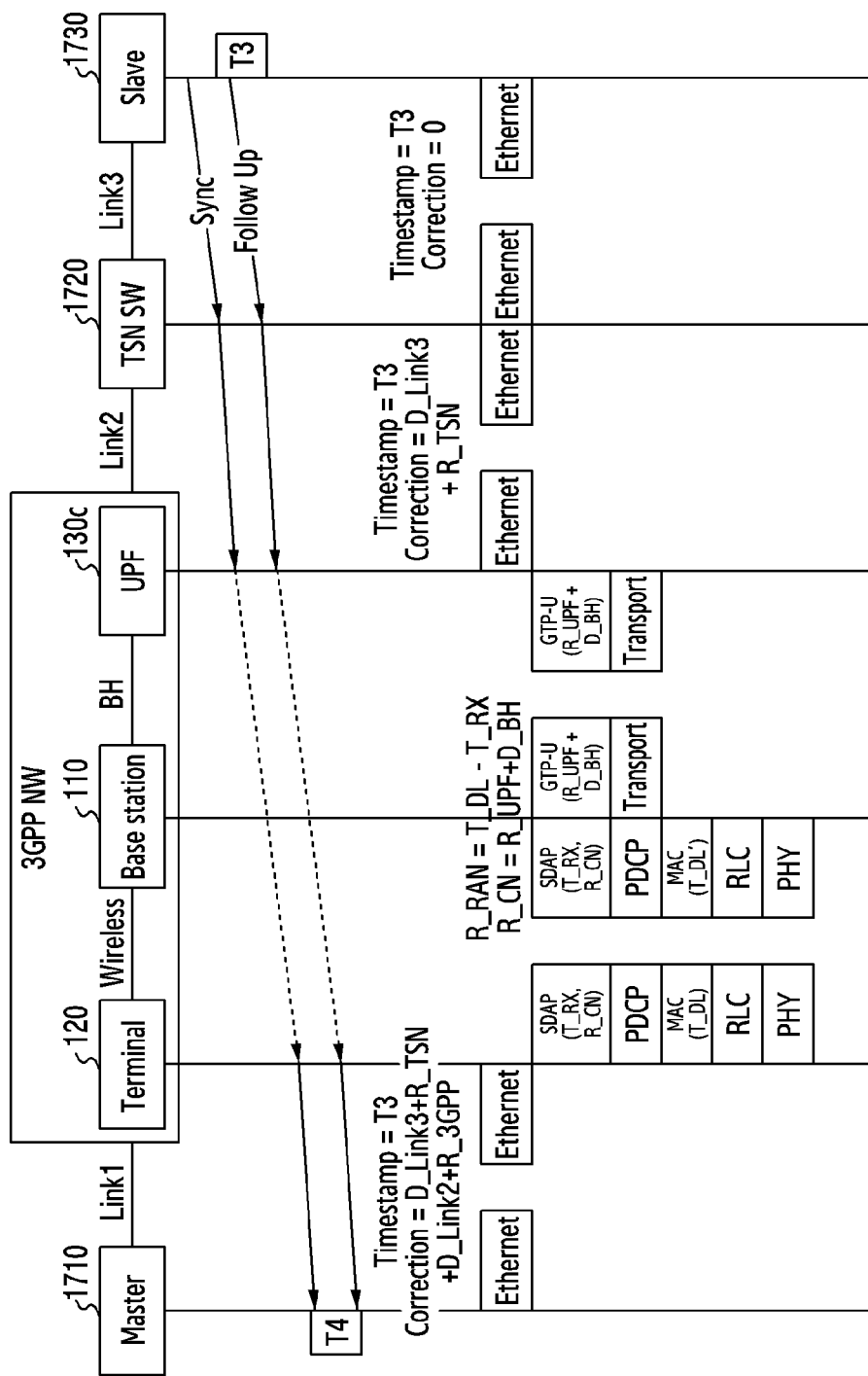
FIG. 17 illustrates a clock synchronization method in a downlink in a wireless communication system according to various embodiments of the disclosure.

Referring to FIG. 16, the terminal 120 and the UPF 130*c* may perform periodic link delay measurement with an adjacent TSN system. Also, a residence time R_3GPP in a 3GPP network may be grasped by the UPF 130*c* in a manner similar to that described in FIG. 11. In various embodiments, a delay time of a backhaul may be assumed to be known in advance by the UPF 130c through a management system or a separate measurement method. In FIG. 16, R_UE may denote a residence time at the terminal 120, R_UPF may denote a residence time at the UPF 130c, and R_TSN may denote a residence time at a TSN SW 1620. BH may refer to a backhaul whose delay is symmetrical. Air may refer to a 3GPP wireless environment where the delay is not symmetric. In FIG. 16, the master 1610 may transmit the Sync frame and the Follow_Up frame to the terminal 120 at a time T1. Here, the timestamp may be set to T1 and the correction field may be set to zero. The UPF 130c may transmit, to the TSN SW 1620, the Sync frame and the Follow_Up frame transmitted through the terminal 120 and the base station 110. At this time, the timestamp may be determined as T1, and the correction field may be determined as a sum of a link delay (D_Link) and a residence time R_3GPP in a 3GPP network. Next, the TSN SW 1620 may transmit the Sync frame and the Follow_Up frame to the slave 1630. Here, the timestamp is set to T1, the correction field is set to a sum of the link 1 delay D_Link1, the residence time R_3GPP in the 3GPP network, a link 2 delay D_Link2, and a residence time R_TSN in the TSN SW 1620. In FIG. 16, T_UL may refer to a PHY frame time when the terminal 120 transmits an uplink Ethernet wirelessly. At this time, the PHY frame may be synchronized with a base station GPS time. T_UL' may refer to a PHY frame time when the base station 110 receives the uplink Ethernet from the radio. At this time, the PHY frame may be synchronized with the base station GPS time. T_TX may refer to a GPS time at which the base station 110 transmits the GTP-U payload to the UPF 130c. FIG. 17 to be described later shows a clock synchronization process using a downlink in a network supporting IEEE 802.1 AS and a 3GPP network.

FIG. 17 illustrates a clock synchronization method in a downlink in a wireless communication system according to various embodiments of the disclosure.

Referring to FIG. 17, the terminal 120 and the UPF 130c may perform periodic link delay measurement with an adjacent TSN system. Also, a residence time R_3GPP in a 3GPP network may be grasped by the terminal 120 in a manner similar to that described in FIG. 12. A difference between FIGS. 12 and 17 is that a value transmitted to the base station 110 by the UPF 130c is R_CN including a delay time of a backhaul other than R_UPF, and the base station 110 may deliver R_CN instead of R_UPF to the terminal 120. In various embodiments, the delay time of the backhaul may be assumed to be known in advance by the UPF 130c through a management system or a separate measurement method. In FIG. 17, R_UE denotes a residence time at the terminal 120, R_UPF denotes a residence time at the UPF 130c, and R_TSN denotes a residence time at the TSN SW 1720. BH may refer to a backhaul whose delay is symmetrical. Air may refer to a 3GPP wireless environment where the delay is not symmetric. In FIG. 17, the master 1730 may transmit the Sync frame and the Follow_Up frame to a TSN SW 1720 at a time T3. Here, the timestamp may be set to T3 and the correction field may be set to zero. The TSN SW 1720 may transmit, to the UPF 130c, the transmitted Sync frame and Follow_Up frame. At this time, the timestamp may be determined as T3, and the correction field may be determined as a sum of the link 3 delay (D_Link3) and the residence time R_TSN of the TSN SW 1720. Next, the Sync frame and the Follow_Up frame may be transmitted to the slave 1710 via the base station 110 and the terminal 120. The slave 1710 may receive the Sync frame and the Follow_Up frame at a time T4. At this time, the time stamp is set to T3 and the correction field is set to a sum of the link 3 delay D_Link3, the residence time R_TSN in the TSN SW 1720, the link 2 delay D_Link2, and the residence time R_3GPP in the 3GPP system.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements. The reception time maybe referred to as the ingress time The reception time maybe referred to as the ingress time. The transmission time referred to as the egress time.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a device for a user plane function (UPF) in a 5$^{th}$ generation system (5GS), the method comprising:
   receiving, from a node of a time sensitive network (TSN), a message for synchronization;
   generating an updated message for synchronization by including:
      information for determining a residence time spent within the 5GS, and
      information of a link delay from the node of TSN, wherein the link delay is added to a correction field of the message; and
   transmitting, to a terminal in the 5GS, the updated message for synchronization.

2. A method performed by a terminal in a 5$^{th}$ generation system (5GS), the method comprising:
   receiving, from a device for a user plane function (UPF) in the 5GS, a message for synchronization including:
      information for determining a residence time spent within the 5GS, and
      information of a link delay from a node of a time sensitive network (TSN) in a correction field of the message;
   identifying a residence time; and
   transmitting, to a slave associated with the TSN, an updated message including the residence time added to the correction field of the updated message.

3. A terminal in a 5$^{th}$ generation system (5GS), the terminal comprising:
   a transceiver; and
   at least one processor configured to:
      receive, from a device for a user plane function (UPF) in the 5Gs, a message for synchronization including:
         information for determining a residence time spent within the 5GS, and
         information of a link delay from a node of a time sensitive network (TSN) in a correction field of the message;
      identify a residence time; and
      transmit, to a slave associated with the TSN, an updated message including the residence time added to the correction field of the updated message.

4. The method of claim 1, wherein the message comprises a sync frame or a follow up frame.

5. The method of claim 1, wherein the residence time is added to a correction field of the updated message.

6. The method of claim 1, wherein the residence time is a difference between a time at which the message is received and a time at which the terminal receives the updated message.

7. The method of claim 1, wherein the generating the updated message comprises adding the link delay to the correction field of the message.

8. The method of claim 2, wherein the message comprises a sync frame or a follow up frame.

9. The method of claim 2, wherein the link delay is added to the correction field of the message for synchronization.

10. The method of claim 2, wherein the residence time is a difference between a time at which the device for the UPF receives a message from a node of the TSN and a time at which the terminal receives the message.

11. The method of claim 2, wherein the identifying the residence time comprises adding the residence time to the correction field of the updated message.

12. The terminal of claim 3, wherein the message comprises a sync frame or a follow up frame.

13. The terminal of claim 3, wherein the link delay is added to the correction field of the message for synchronization.

14. The terminal of claim 3, wherein the residence time is a difference between a time at which the device for the UPF receives a message from a node of the TSN and a time at which the terminal receives the message.

15. The terminal of claim 3, wherein the at least one processor is further configured to add the residence time to the correction field of the updated message.

16. A device for a user plane function (UPF) in a 5th generation system (5GS), the device comprising:
   a transceiver; and
   at least one processor configured to:
      receive, from a node of a time sensitive network (TSN), a message for synchronization;
      generate an updated message for synchronization by including:
         information for determining a residence time spent within the 5GS, and
         information of a link delay from the node of TSN, wherein the link delay is added to a correction field of the message; and
      transmit, to a terminal in the 5GS, the updated message for synchronization.

17. The device of claim 16, wherein the message comprises a sync frame or a follow up frame.

18. The device of claim 16, wherein the residence time is added to a correction field of the updated message.

19. The device of claim 16, wherein the residence time is a difference between a time at which the message is received and a time at which the terminal receives the updated message.

20. The device of claim 16, wherein the at least one processor is further configured to add the link delay to the correction field of the message.

* * * * *